United States Patent
Wang

(10) Patent No.: US 8,769,661 B2
(45) Date of Patent: Jul. 1, 2014

(54) VIRTUAL PRIVATE NETWORK NODE INFORMATION PROCESSING METHOD, RELEVANT DEVICE AND SYSTEM

(75) Inventor: Yuchen Wang, Beijing (CN)

(73) Assignee: Chengdu Huawei Symantec Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/289,552

(22) Filed: Nov. 4, 2011

(65) Prior Publication Data

US 2012/0124660 A1   May 17, 2012

Related U.S. Application Data

(63) Continuation of application No. PCT/CN2010/072424, filed on May 4, 2010.

(30) Foreign Application Priority Data

| May 4, 2009 | (CN) | 2009 1 0137658 |
| May 4, 2009 | (CN) | 2009 1 0137660 |
| May 4, 2009 | (CN) | 2009 1 0139354 |

(51) Int. Cl.
*H04L 29/06* (2006.01)

(52) U.S. Cl.
USPC .................................. 726/12; 726/3

(58) Field of Classification Search
USPC ............. 726/1–36; 713/150–194; 380/1–287
See application file for complete search history.

(56) References Cited

U.S. PATENT DOCUMENTS

| 2005/0125692 A1* | 6/2005 | Cox et al. ..................... 713/201 |
| 2007/0157303 A1* | 7/2007 | Pankratov ..................... 726/11 |
| 2008/0298592 A1* | 12/2008 | Khalid et al. ................ 380/278 |

FOREIGN PATENT DOCUMENTS

| CN | 101557336 A | 10/2009 |
| CN | 101557337 A | 10/2009 |
| CN | 101572729 A | 11/2009 |

OTHER PUBLICATIONS

"Dynamic Multipoint VPN (DMVPN) Design Guide" (Version 1.1), Cisco, Jul. 10, 2008.*
"Guide to IPsec VPNs" Natl. Inst. Stand. Technol. Spec. Publ. 800-77, 126 pages. (Dec. 2005).*
International Search Report in corresponding PCT Application No. PCT/CN2010/072424 (Aug. 12, 2010).

* cited by examiner

*Primary Examiner* — Chau Le
*Assistant Examiner* — Don Zhao
(74) *Attorney, Agent, or Firm* — Leydig, Voit & Mayer, Ltd.

(57) ABSTRACT

A Virtual Private Network (VPN) node information processing method and a VPN node information processing device are provided, in which the method comprises: receiving an access request message sent by a node, in which the access request message at least carries authentication information, a current real Internet Protocol (IP) address, a node name and information indicating whether to accept extranet connection of the node; allocating a virtual IP address for the node when the authentication information of the node is correct; and registering the current real IP address, the node name, the information indicating whether to accept the extranet connection, and the virtual IP address of the node as registration information. Through the method and the device, when a node is added into a VPN, configuration of other nodes does not need to be adjusted.

4 Claims, 10 Drawing Sheets

VIRTUAL PRIVATE NETWORK NODE INFORMATION PROCESSING METHOD, RELEVANT DEVICE AND SYSTEM

CROSS-REFERENCE TO RELATED APPLICATIONS

This application is a continuation of International Application No. PCT/CN2010/072424 filed May 4, 2010, which claims priority to Chinese Patent Application No. 200910139354.3, filed May 4, 2009. This application claims further priority to Chinese Patent Application No. 200910137660.3, filed May 4, 2009, and Chinese Patent Application No. 200910137658.6, filed May 4, 2009, all of which are both incorporated herein by reference in their partial content.

FIELD OF THE INVENTION

The present invention relates to the field of communication technologies, and in particular, to a Virtual Private Network (VPN) node information processing method, relevant device and system.

BACKGROUND OF THE INVENTION

At present, the technology of flexibly, securely and dynamically establishing a VPN between different node devices through a public network (Internet in general) is applied increasingly and widely. The VPN may help establish reliable and secure connection among a remote user, a company branch organization, a business partner as well as a supplier and an intranet, to ensure secure data transmission.

In the conventional VPN, each node is pre-configured with registration information of all other nodes; for example, current real Internet Protocol (IP) addresses, virtual IP addresses, and information indicating whether to accept extranet connection of the other node devices are configured. The node may establish a corresponding network tunnel with the other nodes according to the registration information of the other nodes. For example, when the other nodes accept the extranet connection, the node may establish a network tunnel in a direct connection channel mode with other nodes according to the real IP addresses of other nodes; and when other nodes do not accept the extranet connection, the node may establish a network tunnel in a virtual switch mode with the other nodes according to the virtual IP address of the other nodes.

However, the inventors find that, in the conventional VPN, when a node is added, it is required to configure the added node with the registration information of the other original nodes and adjust the configuration of the other original nodes at the same time. When one node is separated from the network, it is also required to adjust the configuration of the other original nodes, that is, the adding or separation of the node in the conventional VPN inevitably causes that the other nodes correspondingly adjust their own configuration. Therefore, the flexibility of the conventional VPN is poor, which as a result is only generally applicable to a topology structure and an environment with fixed network configuration.

SUMMARY OF THE INVENTION

Embodiments of the present invention provide a VPN node information processing method, relevant device and system, which is capable of improving the flexibility of the VPN.

In order to achieve the above objective, the embodiments of the present invention provide the following technical solutions.

An embodiment of the present invention provides a VPN node information processing method, which includes:

receiving an access request message sent by a node, in which the access request message at least carries authentication information, a current real IP address and a node name, and information indicating whether to accept extranet connection of the node;

allocating a virtual IP address for the node when the authentication information of the node is correct; and registering the current real IP address, the node name, the information indicating whether to accept the extranet connection, and the virtual IP address of the node as registration information.

An embodiment of the present invention provides a VPN node information processing device, which includes:

a first receiving unit, configured to receive an access request message sent by a node, in which the access request message at least carries authentication information, a current real IP address and a node name, and the information indicating whether to accept the extranet connection of the node;

a judging unit, configured to judge whether the authentication information of the node is correct;

an allocation unit, configured to allocate a virtual IP address for the node when the judging unit judges that the authentication information of the node is correct; and a register unit, configured to register the current real IP address, the node name, the information indicating whether to accept the extranet connection, and the virtual IP address of the node as registration information.

An embodiment of the present invention provides a VPN node device which includes:

an obtaining unit, configured to obtain authentication information, a current real IP address, a node name, and information indicating whether to accept extranet connection of the obtaining unit; and a sending unit, configured to place the authentication information, the current real IP address, the node name and the information indicating whether to accept extranet connection into an access request message, and then send the access request message to a VPN node information processing device.

An embodiment of the present invention provides a VPN system, which includes:

a VPN node device and a VPN node information processing device.

The VPN node device is configured to obtain authentication information, a current real IP address, a node name, and information indicating whether to accept extranet connection of the VPN node device, place the authentication information, the current real IP address, the node name, and the information indicating whether to accept the extranet connection of the VPN node device into an access request message, and then send the access request message to the VPN node information processing device.

The VPN node information processing device is configured to receive an access request message sent by the VPN node device, in which the access request message at least carries the authentication information, the current real IP address, the node name, and the information indicating whether to accept the extranet connection of the VPN node device, allocate a virtual IP address for the VPN node device when it is judged that the authentication information is correct, and register the current real IP address, the node name, the information indicating whether to accept the extranet connection, and the virtual IP address of the VPN node device as registration information.

An embodiment of the present invention provides a network tunnel establishing method, which includes: initiating, by a first VPN node, a query request to a corresponding VPN gateway according to a locally pre-configured VPN gateway address, in which the query request carries a node identifier (ID) of a second VPN node; receiving, by the first VPN node, registration information of the second VPN node fed back by the VPN gateway, in which the registration information of the second VPN node at least includes address information of the second VPN node; and establishing, by the first VPN node, a direct connection network tunnel with the second VPN node according to the registration information of the second VPN node.

An embodiment of the present invention provides a network tunnel establishing method, which includes: receiving, by a second VPN node, a tunnel establishing request sent by a first VPN node, in which the tunnel establishing request includes a node ID of the first VPN node and address information of the first VPN node; and storing, by the second VPN node, the node ID of the first VPN node and the address information of the first VPN node, executing a relevant tunnel establishing process, and feeding back a tunnel establishing response to the first VPN node.

An embodiment of the present invention provides a data transmission method, which includes: receiving, by a VPN gateway, a query request sent by a first VPN node, in which the query request carries a node ID of a second VPN node; locally querying, by the VPN gateway, registration information of the second VPN node according to the node ID of the second VPN node, in which the registration information of the second VPN node at least includes address information of the second VPN node; feeding back, by the VPN gateway, the registration information of the second VPN node to the first VPN node, so that the first VPN node establishes a direct connection network tunnel with the second VPN node according to the registration information of the second VPN node.

An embodiment of the present invention provides a VPN server, which includes: a receiving unit, configured to receive a message sent by a first node, in which the message is used for querying registration information of a second node; a sending unit, configured to send the pre-stored registration information of the second node to the first node, so that the first node establishes a corresponding network tunnel with the second node, in which the registration information of the second node at least includes information indicating whether the second node accepts external connection.

An embodiment of the present invention provides a VPN system, which includes: a VPN node and a VPN server. The VPN node is configured to query registration information of a second node from the VPN server, so as to determine whether the second node accepts external connection, in which the registration information of the second node at least includes the information indicating whether the second node accepts the external connection, and establish a corresponding network tunnel with the second node according to the queried registration information. The VPN server is configured to receive a message sent by the VPN node, in which the message is used for querying the registration information of the second node, and send the pre-stored registration information of the second node to the VPN node, so that the VPN node establishes a corresponding network tunnel with the second node, in which the registration information of the second node at least includes the information indicating whether the second node accepts the external connection.

It can be seen from the above technical solutions that, the embodiments of the present invention have the following advantages.

Compared with the conventional art, the embodiments of the present invention adopt the VPN node information processing device to centralized-register the registration information of the VPN node, so as to avoid configuring each VPN node with registration information of other VPN nodes. When a VPN node is added, it is merely required to register the registration information of the added VPN node on the VPN node information processing device, and the configuration of other VPN nodes does not need to be adjusted, so that the VPN is capable of supporting a dynamically changed network structure, thereby improving the flexibility of the VPN.

In the embodiments of the present invention, when the first VPN node expects to communicate with the second VPN node, the first VPN node may obtain the registration information relevant to the second VPN node from the VPN gateway, and the registration information includes the address information of the second VPN node. Therefore, the first VPN node can establish a direct connection network tunnel with the second VPN node according to the address information of the second VPN node, and the first VPN node and the second VPN node may perform data transmission through the direct connection network tunnel, so it is not required to transmit data through the VPN gateway, thereby reducing a data processing pressure of the VPN gateway, balancing a load of each network element in the VPN, and improving data transmission performance in the VPN.

The embodiments of the present invention enable the first node in the VPN to learn the registration information of the second node, and the registration information includes the information indicating whether the second node accepts the external connection, so that the first node may establish the corresponding network tunnel with the second node according to the registration information of the second node, so as to avoid an attempt on the establishment of the direct connection network tunnel which is still made when the second node does not accept the external connection, thereby reducing the waste of network resources, and improving efficiency of establishing a network tunnel.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solutions of the embodiments of the present invention will be clearly described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
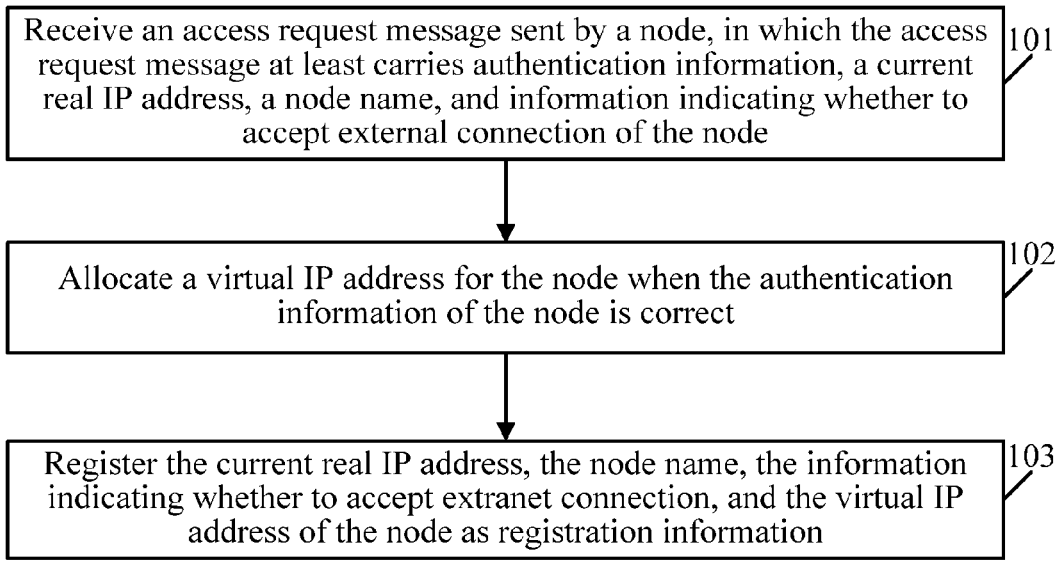
FIG. 1 is a flow chart of a VPN node information processing method according to an embodiment of the present invention.

Referring to FIG. 1, FIG. 1 is a flow chart of a VPN node information processing method according to Embodiment 1 of the present invention. As shown in FIG. 1, the method may include the following steps.

Step 101: Receive an access request message sent by a node, in which the access request message at least carries authentication information, a current real IP address, a node name, and information indicating whether to accept extranet connection of the node.

The node mentioned in this embodiment and subsequent embodiments includes, but is not limited to, a mobile phone, a palm computer, a personal computer, a server or a gateway.

Preferably, the authentication information of the node mentioned in this embodiment and the subsequent embodiments includes, but is not limited to, an account and a password of the node, and is provided by a service supplier in advance according to the requirements (for example, the number of nodes, and a VPN topology structure) of a VPN the node expects to access.

For example, the current real IP address of the node may be an IP address of the node in Internet, such as an IP version 4 (IPv4) address or an IP version 6 (IPv6) address, or an address obtained after the combination of the IP address of the node in the Internet and a port of a Transmission Control Protocol (TCP)/User Datagram Protocol (UDP), or other service addresses of the node indicated through a Uniform Resource Locator (URL) in the Internet, and the specific type of the address is not limited herein.

Definitely, the access request message may further carry other relevant information of the node in addition to the authentication information, the current real IP address and the node name, and the information indicating whether to accept the extranet connection of the node.

Step 102: Allocate a virtual IP address for the node when the authentication information of the node is correct.

If the authentication information of the node received in step 101 is the account and the password of the node, it is judged whether the account and the password of the node are both correct in step 102. If the account and the password of the node are both correct, a virtual IP address is allocated for the node, and the allocated virtual IP address is sent to the node.

On the contrary, if either the account or the password of the node is incorrect, the virtual IP address is not allocated for the node. At this time, error information is sent to the node, and network connection is closed.

Step 103: Register the current real IP address, the node name, the information indicating whether to accept extranet connection, and the virtual IP address of the node as registration information.

The registering the current real IP address, the node name, the information indicating whether to accept extranet connection, and the virtual IP address as the registration information may implement centralized management on the registration information of the node, and in this way, each node does not need to be configured with the registration information of other nodes, so as to be convenient for subsequent nodes to query the registration information of other nodes and the current node.

Figure 2:
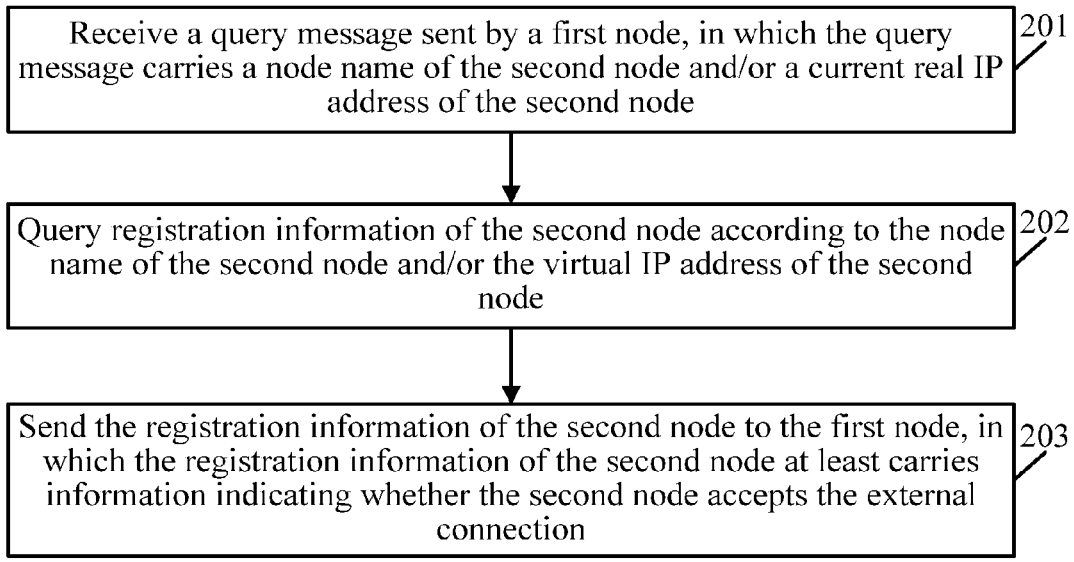
FIG. 2 is a flow chart of a method for querying node registration information according to an embodiment of the present invention.

For example, after the registering the current real IP address, the node name, the information indicating whether to accept extranet connection, and the virtual IP address of the node as the registration information in step 103, in the VPN node information processing method according to the embodiment of the present invention, the node is allowed to query the registration information. Referring to FIG. 2 together, FIG. 2 is a flow chart of a method for querying node registration information according to Embodiment 1 of the present invention. As shown in FIG. 2, the method may include the following steps.

Step 201: Receive a query message sent by a first node, in which the query message carries a node name of the second node and/or a virtual IP address of the second node.

Step 202: Query registration information of the second node according to the node name of the second node and/or the virtual IP address of the second node.

Step 203: Send the registration information of the second node to the first node, in which the registration information of the second node at least carries information indicating whether the second node accepts the extranet connection.

In the VPN node information processing method according to the embodiment of the present invention, the first node is allowed to query the registration information of the second node, and in order to definitely learn the registration information of the second node which the first node needs to query, the query message sent by the first node is required to carry the information used for identifying the second node. Since names and current real IP addresses of nodes are different from each other, the query message sent by the first node may carry the name of the second node and/or the virtual IP address of the second node.

Definitely, the query message sent by the first node may further carry other information used for identifying the second node, but the embodiment of the present invention is not limited herein.

For example, after the registering the current real IP address, the node name, the information indicating whether to accept extranet connection, and the virtual IP address of the node as the registration information in step 103, the VPN node information processing method according to the embodiment of the present invention may further include the following steps.

Receive a query message sent by a first node, in which the query message carries a node name of the first node and/or a virtual IP address of the first node;

Query registration information of the first node according to the node name of the first node and/or the virtual IP address of the first node; and Send the registration information of the first node to the first node, in which the registration information of the first node at least carries the information indicating whether the first node accepts the extranet connection.

In the VPN node information processing method according to the embodiment of the present invention, the first node is allowed to query the registration information of the first node, and likewise, the query message sent by the first node is required to carry the information used for identifying the first node, for example, the name of the first node and/or the virtual IP address of the first node.

Figure 3:
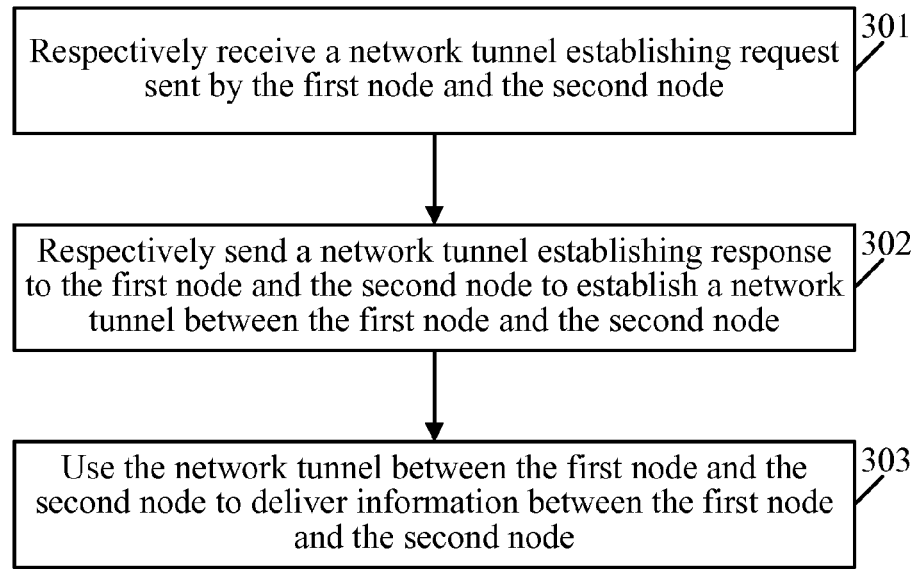
FIG. 3 is a flow chart of a VPN node communication method according to an embodiment of the present invention.

For example, after the first node queries the registration information of the second node and the registration information of the first node, if the first node finds that neither the second node nor the first node accepts the extranet connection, in the VPN node information processing method according to the embodiment of the present invention, a network tunnel between the first node and the second node may be used to deliver information between the first node and the second node. Referring to FIG. 3 together, FIG. 3 is a flow chart of a VPN node communication method according to Embodiment 1 of the present invention. As shown in FIG. 3, the method may include the following steps.

Step 301: Respectively receive a network tunnel establishing request sent by the first node and the second node.

Step 302: Respectively send a network tunnel establishing response to the first node and the second node to establish a network tunnel between the first node and the second node.

Step 303: Use the network tunnel between the first node and the second node to deliver information between the first node and the second node.

Before the second node sends the network tunnel establishing request, the second node needs to receive a prompt message sent by the first node, in which the prompt message is sent in the case that the first node finds that neither the first node nor the second node accepts the extranet connection, and is used to prompt the second node to establish an indirect network connection in a virtual channel mode with the first node.

The network tunnel establishing request sent by the first node is sent through a virtual IP address of the first node, and the network tunnel establishing request sent by the second node is sent through a virtual IP address of the second node.

For example, after the first node queries the registration information of the second node and the registration information of the first node, if the first node finds that the second node accepts the extranet connection, the first node may initiatively send a network tunnel establishing request to the second node. After the first node receives a response sent by the second node, the first node establishes a direct connection network tunnel in a direct connection channel mode with the second node.

The message is sent between the first node and the second node through a current real IP address.

For example, after the first node queries the registration information of the second node and the registration information of the first node, if the first node finds that the second node does not accept the extranet connection, while the first node accepts the extranet connection, the first node may actively send a message for prompting the second node to establish a network tunnel with the first node to the second node, receives a network tunnel establishing request sent by the second node, and establishes a direct connection network tunnel in a direct connection channel mode with the second node after sending a response to the second node. The message is sent between the first node and the second node through a current real IP address.

In the embodiment of the present invention, the registration information of the node may be centralized-registered, thereby avoiding that each node in the VPN is configured with the registration information of other nodes. When a node is added, it is merely required to register the registration information of the added node, and it is not required to adjust the configuration of other nodes, so that the VPN may support a dynamically changed network structure, thereby improving the flexibility of the VPN.

Referring to FIG. 1, FIG. 1 also discloses a flow chart of a Virtual Network node information processing method according to Embodiment 1 of the present invention. As shown in FIG. 1, the method may include the following steps.

receiving an access request message sent by a node, wherein the access request message at least carries authentication information, a current real Internet Protocol (IP) address, a node name and information indicating whether to accept extranet connection of the node;

allocating a virtual IP address for the node when the authentication information of the node is correct; and registering the current real IP address, the node name, the information indicating whether to accept the extranet connection, and the virtual IP address of the node as registration information.

The Virtual Network node information processing method in FIG. 2 further include following steps:

receiving a query message sent by a first node, wherein the query message carries a node name of a second node and/or a virtual IP address of the second node;

querying registration information of the second node according to the node name of the second node and/or the virtual IP address of the second node; and sending the registration information of the second node to the first node, wherein the registration information of the second node at least carries information indicating whether the second node accepts the extranet connection.

The Virtual Network node information processing method according to Embodiment 1 in FIG. 3 include following steps:

receiving a query message sent by the first node, wherein the query message carries a node name of the first node and/or a virtual IP address of the first node;

querying registration information of the first node according to the node name of the first node and/or the virtual IP address of the first node; and sending the registration information of the first node to the first node, wherein the registration information of the first node at least carries information indicating whether the first node accepts the extranet connection.

In The Virtual Network node information processing method according to Embodiment 1 in FIG. 3, wherein if neither the second node nor the first node accepts the extranet connection, the method further include:

respectively receiving a network tunnel establishing request sent by the first node and a network tunnel establishing request sent by the second node;

respectively sending a network tunnel establishing response to the first node and a network tunnel establishing response to the second node so as to establish a network tunnel between the first node and the second node; and delivering information between the first node and the second node by using the network tunnel between the first node and the second node.

In the embodiment of the present invention, the registration information of the node may be centralized-registered, thereby avoiding that each node in the Virtual Network node is configured with the registration information of other nodes. When a node is added, it is merely required to register the registration information of the added node, and it is not required to adjust the configuration of other nodes, so that the Virtual Network node may support a dynamically changed network structure, thereby improving the flexibility of the Virtual Network node.

Embodiment 2

Figure 4:
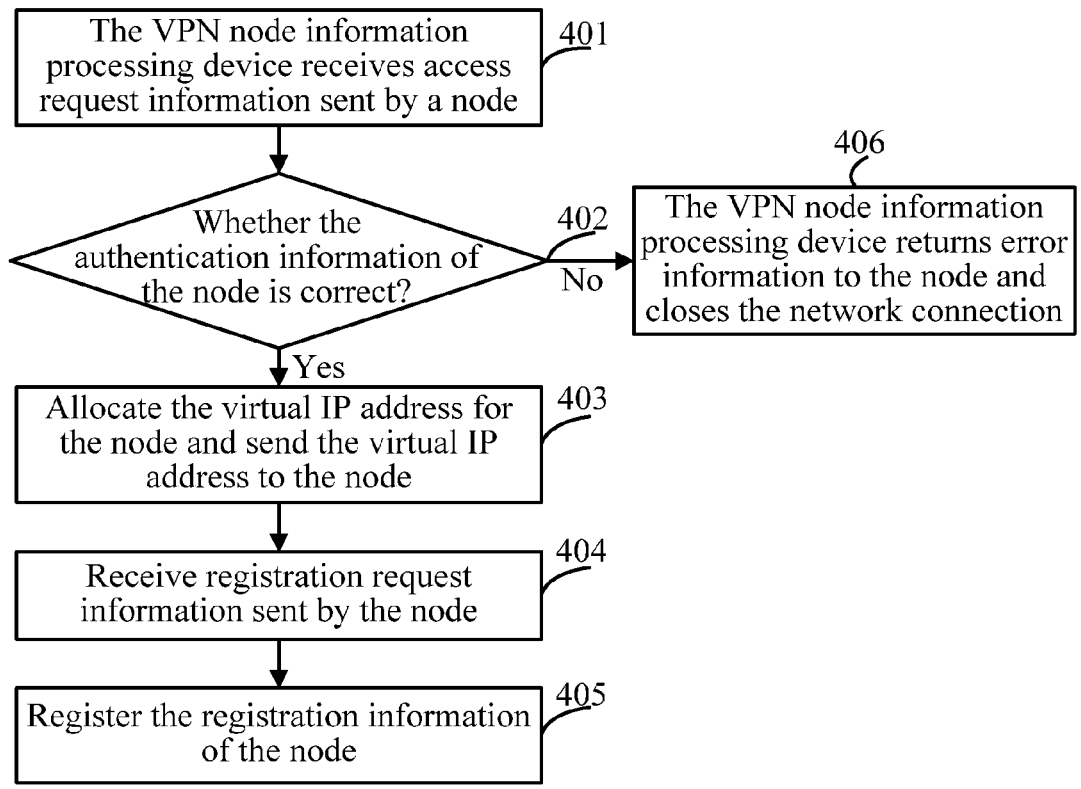
FIG. 4 is a flow chart of a VPN node information processing method according to an embodiment of the present invention.

FIG. 4 is a flow chart of a VPN node information processing method according to Embodiment 2 of the present invention. Referring to FIG. 4, in the method according to the embodiment of the present invention, it is required to pre-deploy a VPN node information processing device on Internet. The VPN node information processing device should have a current real IP address, which may be an IP address of the VPN node information processing device in Internet, or an address obtained after the combination of the IP address in the Internet and a TCP/UDP port, or other service addresses indicated through a URL in the Internet. As shown in FIG. 4, the method may include the following steps.

Step 401: The VPN node information processing device receives access request information sent by a node.

The access request information sent by the node is sent according to a current real IP address of the learn VPN node information processing device.

The access request information sent by the node may carry, but is not limited to, a current real IP address and authentication information of the node.

The authentication information of the node mentioned in this embodiment and the subsequent embodiments includes, but is not limited to, an account and a password of the node, and is provided by a service supplier in advance according to the requirements (for example, the number of the nodes, and a VPN topology structure) of a VPN the node expects to access.

Step 402: After receiving the access request information sent by the node, the VPN node information processing device judges whether the authentication information of the node is correct, and if the authentication information of the node is correct, step 403 is performed; if the authentication information of the node is incorrect, step 406 is performed.

If the VPN node information processing device judges that the account and the password of the node are both correct in step 402, the VPN node information processing device allocates a virtual IP address for the node, and sends the allocated virtual IP address to the node.

On the contrary, if either the account or the password is incorrect, the virtual IP address is not allocated for the node. At this time, error information is sent to the node, and the network connection is closed.

Step 403: Allocate the virtual IP address for the node and send the virtual IP address to the node.

When the authentication information of the node is correct, the VPN node information processing device may allocate a virtual IP address for the node, in which virtual IP addresses allocated for nodes are different from each other.

In addition, when the VPN node information processing device may establish a route and access control policy with other different VPNs, the functions and actions of the VPN node information processing device are like a virtual router or firewall in terms of the node in the VPN. In this way, when the VPN node information processing device allocates the virtual IP address for the node, the information such as the virtual IP address of a virtual gateway in the VPN may be further allocated for the node.

After the node receives the virtual IP address sent by the VPN node information processing device, the node may perform corresponding configuration on a virtual network interface card in the node, and then sends the registration information to the VPN node information processing device.

It should be noted that, protocol encapsulation is performed on the registration information sent by the node in a secure channel established between the node and the VPN node information processing device, and the registration information is transmitted to the VPN node information processing device. The secure channel established between the node and the VPN node information processing device is established after the VPN node information processing device finishes the sending the virtual IP address to the node.

Step 404: Receive registration request information sent by the node, in which the registration request information carries the registration information of the node including a current real IP address, a virtual IP address and a node name.

Step 405: Register the registration information of the node.

Step 406: The VPN node information processing device returns error information to the node and closes the network connection.

The difference between this embodiment and Embodiment 1 lies in that, in Embodiment 1, the node sends the access request message, and the access request message at least carries the authentication information, the current real IP address, the node name and the information indicating whether to accept the extranet connection of the node, and in this way, after judging that the authentication information of the node is correct, the VPN node information processing device may allocate the virtual IP address for the node, and directly registers the current real IP address, the node name, the information indicating whether to accept the extranet connection, and the virtual IP address of the node. However, in this embodiment, after the node receives the virtual IP address allocated by the VPN node information processing device, the node sends the current real IP address, the node name, the information indicating whether to accept the extranet connection, and the virtual IP address of the node as the registration information to the VPN node information processing device for registration.

In the embodiment of the present invention, the registration information of the node may be centralized-registered, thereby avoiding that each node in the VPN is configured with the registration information of other nodes. When a node is added, it is merely required to register the registration information of the added node, and it is not required to adjust the configuration of other nodes, so that the VPN may support a dynamically changed network structure, thereby improving the flexibility of the VPN.

Embodiment 3

Figure 5:
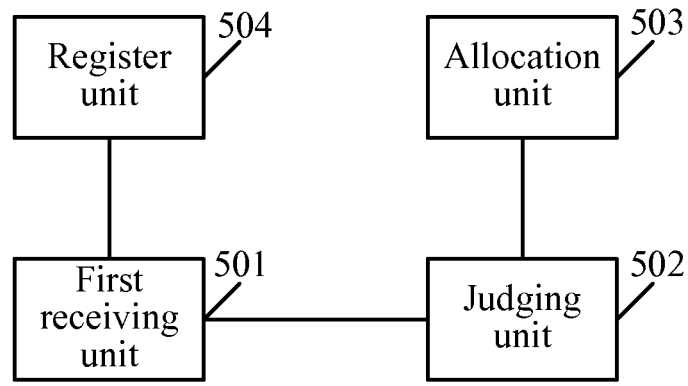
FIG. 5 is a structure diagram of a VPN node information processing device according to an embodiment of the present invention.

FIG. 5 is a structure diagram of a VPN node information processing device according to Embodiment 3 of the present invention. Referring to FIG. 5, the VPN node information processing device according to the embodiment of the present invention is deployed in Internet, and has a real IP address. As shown in FIG. 5, the VPN node information processing device may include a first receiving unit 501, a judging unit 502, an allocation unit 503, and a register unit 504.

The first receiving unit 501 is configured to receive an access request message sent by a node, in which the access request message at least carries authentication information, current real IP address, node name and information indicating whether to accept extranet connection of the node.

For example, the authentication information of the node includes, but is not limited to, an account and a password of the node, and is provided by a service supplier in advance according to the requirements (for example, the number of the nodes, and a VPN topology structure) of a VPN the node expects to access.

The judging unit 502 is configured to judge whether the authentication information of the node is correct.

The allocation unit 503 is configured to allocate a virtual IP address for the node when the judging unit 502 judges that the authentication information of the node is correct.

The register unit 504 is configured to register the current real IP address, the node name, the information indicating whether to accept extranet connection, and the virtual IP address of the node as registration information.

Figure 6:
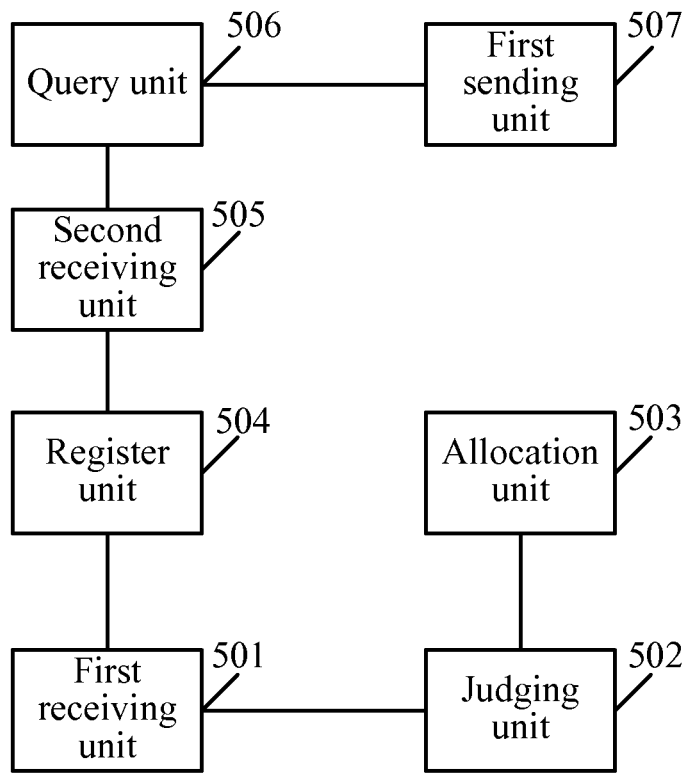
FIG. 6 is a structure diagram of a VPN node information processing device according to an embodiment of the present invention.
Figure 9:
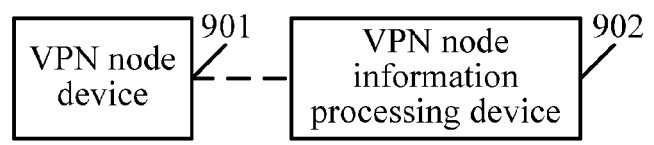
FIG. 9 is a structure diagram of a VPN system according to an embodiment of the present invention.

FIG. 6 is a structure diagram of another VPN node information processing device according to Embodiment 3 of the present invention. Referring to FIG. 6 together, the VPN node information processing device as shown in FIG. 6 is based on the VPN node information processing device as shown in FIG. 9, and further includes: a second receiving unit 505, a query unit 506 and a first sending unit 507.

The second receiving unit 505 is configured to receive a query message sent by a first node after the register unit 504 registers the information such as the current real IP address, the node name, the information indicating whether to accept the extranet connection, and the virtual IP address of the node as the registration information, in which the query message carries the node name of the second node and/or the virtual IP address of the second node.

The query unit 506 is configured to query the registration information of the second node according to the node name of the second node and/or the virtual IP address of the second node.

The first sending unit 507 is configured to send the registration information of the second node to the first node, in which the registration information of the second node at least carries the information indicating whether the second node accepts the extranet connection.

In the VPN node information processing device as shown in FIG. 6, the first node is allowed to query the registration information of the second node, and in order to definitely learn the registration information of the second node which the first node needs to query, the query message sent by the first node is required to carry the information used for identifying the second node. Since names and current real IP addresses of nodes are different from each other, the query message sent by the first node may carry the name of the second node and/or the virtual IP address of the second node.

Definitely, the query message sent by the first node may further carry other information used for identifying the second node, but the embodiment of the present invention is not limited herein.

The second receiving unit 505 is further configured to receive a query message sent by a first node after the register unit 504 registers the current real IP address, the node name, the information indicating whether to accept the extranet connection, and the virtual IP address of the node as the registration information, in which the query message carries the node name of the first node and/or the virtual IP address of the first node.

The query unit 506 is further configured to query the registration information of the first node according to the node name of the first node and/or the virtual IP address of the first node.

The first sending unit 507 is further configured to send the registration information of the first node to the first node, in which the registration information of the first node at least carries the information indicating whether the first node accepts the extranet connection.

In the VPN node information processing device as shown in FIG. 6, the first node is allowed to query the registration information of the first node, and likewise, the query message sent by the first node is required to carry the information used for identifying the first node, for example, the name of the first node and/or the virtual IP address of the first node.

Figure 7:
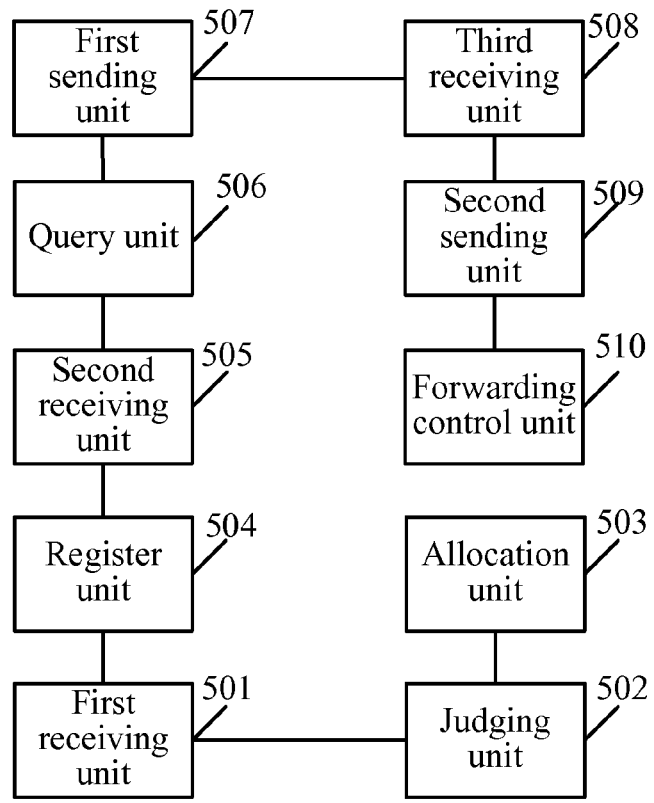
FIG. 7 is a structure diagram of a VPN node information processing device according to an embodiment of the present invention.

FIG. 7 is a structure diagram of another VPN node information processing device according to Embodiment 3 of the present invention. Referring to FIG. 7 together, the VPN node information processing device as shown in FIG. 7 is based on the VPN node information processing device as shown in FIG. 5, and further includes: a third receiving unit 508, a second sending unit 509, and a transmitting control unit 510.

The third receiving unit 508 is configured to receive a network tunnel establishing request sent by the first node after the first sending unit 507 sends the registration information of the second node to the first node, and sends the registration information of the first node to the first node.

The network tunnel establishing request is sent by the first node in the case that the first node finds that neither the second node nor the first node accepts the extranet connection after receiving the registration information of the second node and the first node sent by the first sending unit 507.

The second sending unit 509 is configured to send a network tunnel establishing response to the first node, so as to establish a network tunnel between the second sending unit and the first node.

The third receiving unit 508 is further configured to receive a network tunnel establishing request sent by the second node after the first sending unit 507 sends the registration information of the second node to the first node, and sends the registration information of the first node to the first node.

Before the second node sends the network tunnel establishing request, the second node needs to receive a prompt message sent by the first node, in which the prompt message is sent in the case that the first node finds that neither the first node nor the second node accepts the extranet connection, and is used to prompt the second node to establish an indirect network connection in a virtual channel mode with the first node.

The second sending unit 509 is further configured to send a network tunnel establishing response to the second node, so as to establish a network tunnel between the second sending unit and the second node.

The network tunnel establishing request sent by the first node is sent through the virtual IP address of the first node, and the network tunnel establishing request sent by the second node is sent through the virtual IP address of the second node.

The transmitting control unit 510 is configured to receive information sent by the first node to the second node, and transmit the information to the second node; and receive information sent by the second node to the first node, and transmit the information to the first node.

In the VPN node information processing device according to the embodiment of the present invention, the registration information of the node may be centralized-registered, thereby avoiding that each node in the VPN is configured with the registration information of other nodes. When a node is added, it is merely required to centralized-register the registration information of the added node, and it is not required to adjust the configuration of other nodes, so that the VPN may support a dynamically changed network structure, thereby improving the flexibility of the VPN.

Embodiment 4

Figure 8:
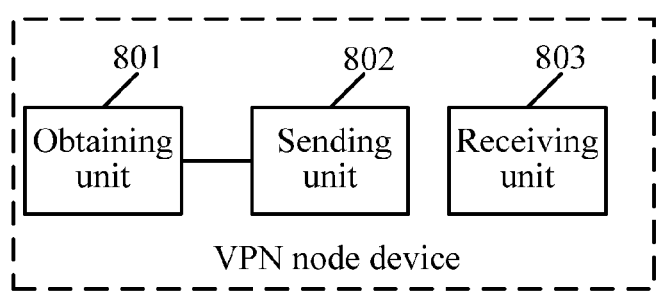
FIG. 8 is a structure diagram of a VPN node device according to an embodiment of the present invention.

FIG. 8 is a structure diagram of a VPN node device according to Embodiment 4 of the present invention. Referring to FIG. 8, the VPN node device according to the embodiment of the present invention includes, but is not limited to, a mobile phone, a palm computer, a personal computer, a server or a gateway. As shown in FIG. 8, the VPN node device may include an obtaining unit 801, and a sending unit 802.

The obtaining unit 801 is configured to obtain authentication information, a current real IP address, a node name and information indicating whether to accept extranet connection of the obtaining unit.

The sending unit 802 is configured to place the authentication information, the current real IP address, the node name and the information indicating whether to accept extranet connection of the obtaining unit into an access request message, and then send the access request message to a VPN node information processing device.

The VPN node information processing device in this embodiment is the same as the VPN node information processing device introduced in Embodiment 3 in the structure and functions, which is not repeated in this embodiment again.

Preferably, the VPN node device according to the embodiment of the present invention may further include a receiving unit 803.

The receiving unit 803 is configured to receive a virtual IP address sent by the VPN node information processing device.

The VPN node device according to the embodiment of the present invention may actively send the authentication information, the current real IP address, the node name and the information indicating whether to accept the extranet connection of the VPN node device to the VPN node information processing device, and actively register with the VPN node information processing device. The VPN node information processing device centralized-registers the authentication information, the current real IP address, the node name and the information indicating whether to accept the extranet connection of the node device, which avoids that the VPN node device is configured with the registration information of other nodes. In addition, when the node is added, the node device does not need to be additionally configured, so that the VPN may support dynamically changed network structure, thereby improving the flexibility of the VPN.

Embodiment 5

Referring to FIG. 9, FIG. 9 is a structure diagram of a VPN system according to Embodiment 5 of the present invention. As shown in FIG. 9, the VPN system may include:

a VPN node device 901 and a VPN node information processing device 902.

The VPN node device 901 is configured to obtain authentication information, a current real IP address, a node name and information indicating whether to accept extranet connection of the VPN node device, place the authentication information, the current real IP address, the node name and the information indicating whether to accept extranet connection of the VPN node device into an access request message, and then send the access request message to the VPN node information processing device 902.

The VPN node information processing device 902 is configured to receive an access request message sent by the VPN node device 901, in which the access request message at least carries the authentication information, the current real IP address, the node name and the information indicating whether to accept extranet connection of the VPN node device 901, allocate a virtual IP address for the VPN node device 901 when it is judged that the authentication information of the VPN node device 901 is correct, and register the current real IP address, the node name, the information indicating whether to accept extranet connection, and the virtual IP address of the VPN node device 901 as registration information.

The VPN system according to the embodiment of the present invention may centralized-register the registration information of the node, thereby avoiding that each node in the VPN is configured with the registration information of other nodes. When a node is added, it is merely required to register the registration information of the added node, and it is not required to adjust the configuration of other nodes, so that the VPN may support a dynamically changed network structure, thereby improving the flexibility of the VPN.

Embodiment 6

Figure 10:
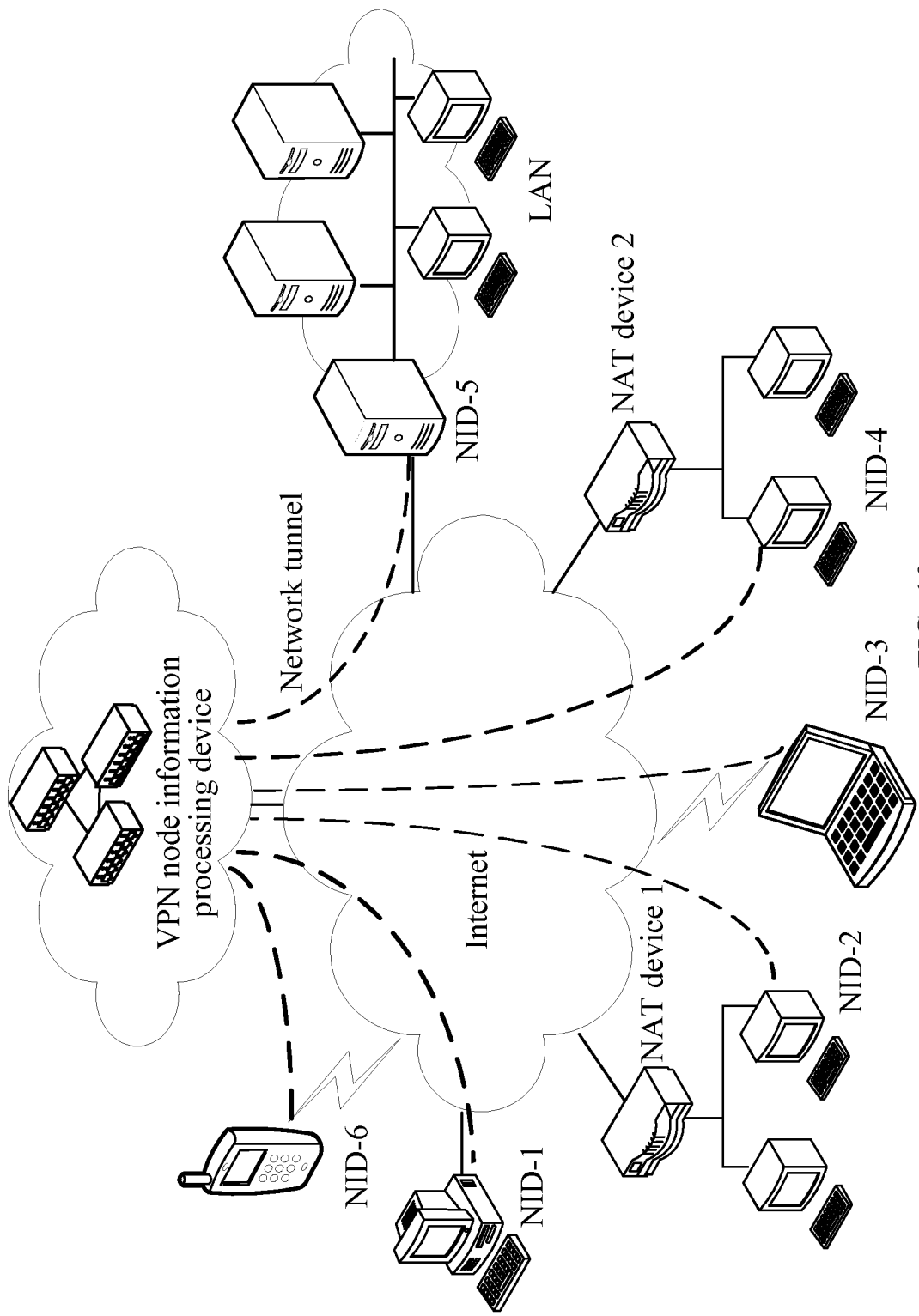
FIG. 10 is a schematic diagram of a VPN according to an embodiment of the present invention.

Referring to FIG. 10, FIG. 10 is a schematic diagram of a VPN according to Embodiment 6 of the present invention. As shown in FIG. 10, the VPN includes a VPN node information processing device and six nodes respectively named NID-1, NID-2, NID-3, NID-4, NID-5, and NID-6, in which the nodes NID-2 and NID-4 are located in a Network Address Translation (NAT) device 1 and an NAT device 2 respectively.

When the VPN node information processing device receives access request messages sent by the nodes NID-1, NID-2, NID-3, NID-4, NID-5, and NID-6 respectively, if it is judged that authentication information carried by the access request messages respectively sent by the nodes NID-1, NID- 2, NID-3, NID-4, NID-5, and NID-6 is correct, the VPN node information processing device sends allocated virtual addresses to the nodes NID-1, NID-2, NID-3, NID-4, NID-5, and NID-6 respectively, and registers the current real IP addresses, the virtual IP addresses and the node names of the nodes NID-1, NID-2, NID-3, NID-4, NID-5, and NID-6 carried in the access request messages sent by the nodes NID-1, NID-2, NID-3, NID-4, NID-5, and NID-6 as the registration information. In this way, the nodes NID-1, NID-2, NID-3, NID-4, NID-5, and NID-6 may be respectively connected to the VPN node information processing device through an established network tunnel to form independent nodes in the VPN. In addition, the node connected to the VPN node information processing device may be used as a gateway to enable other nodes in a Local Area Network (LAN) to access the VPN, such as the node NID-5 in FIG. 10.

After the registration information of the nodes NID-1, NID-2, NID-3, NID-4, NID-5, and NID-6 is registered on the VPN node information processing device, and the nodes NID-1, NID-2, NID-3, NID-4, NID-5, and NID-6, and the VPN node information processing device form a virtual intranet through a network tunnel, in which a network topology structure in the virtual network may be a star network structure.

The VPN according to the embodiment of the present invention may centralized-register the registration information of the node, thereby avoiding that each node in the VPN is configured with the registration information of other nodes. When a node is added, it is merely required to register the registration information of the added node, and it is not required to adjust the configuration of other nodes, so that the VPN may support a dynamically changed network structure, thereby improving the flexibility of the VPN.

Embodiment 7

Figure 11:
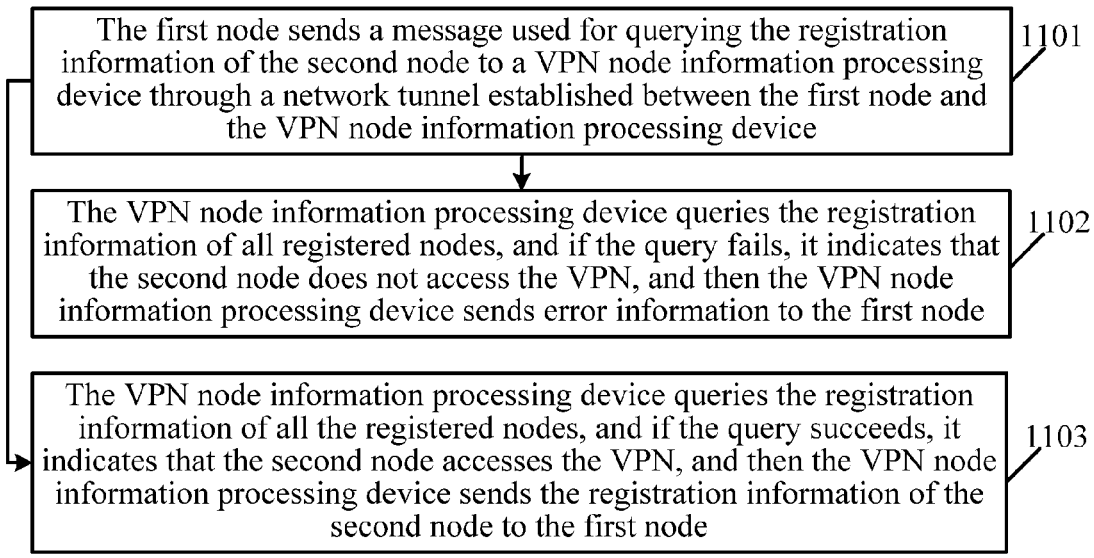
FIG. 11 is a flow chart of a method for querying node registration information according to an embodiment of the present invention.

FIG. 11 is a flow chart of a method for querying node registration information according to Embodiment 7 of the present invention. Referring to FIG. 11, this embodiment is performed on the basis of registering node registration information in the foregoing embodiment. In this embodiment, taking that a first node queries the registration information of a second node as an example, the method for querying VPN registration information according to the embodiment of the present invention is introduced. As shown in FIG. 11, the method may include the following steps.

Step 1101: The first node sends a message used for querying the registration information of the second node to a VPN node information processing device through a network tunnel established between the first node and the VPN node information processing device.

For example, the message used for querying the registration information of the second node and sent by the first node to the VPN node information processing device may carry the information such as a node name of the second node and/or a virtual IP address of the second node.

Step 1102: The VPN node information processing device queries the registration information of all registered nodes, and if the query fails, it indicates that the second node does not access the VPN, and then the VPN node information processing device sends error information to the first node.

Step 1103: The VPN node information processing device queries the registration information of all the registered nodes, and if the query succeeds, it indicates that the second node accesses the VPN, and then the VPN node information processing device sends the registration information of the second node to the first node.

For example, the registration information of the second node at least includes the information indicating whether the second node accepts the extranet connection.

If the second node accepts the extranet connection the first node may establishes a direct connection network tunnel in a direct connection channel mode with the second node according to the current real IP address of the second node. On the contrary, if the second node does not accept the extranet connection, the first node mat establish an indirect network tunnel in a virtual switch mode with the second node according to the virtual IP address of the second node.

If the first node learns the virtual IP address and the real IP address of the second node, the registration information of the second node sent by the VPN node information processing device in step 1103 may be the information indicating whether the second node accepts the extranet connection.

In the VPN node information processing device according to the embodiment of the present invention, the first node is allowed to query the registration information of the second node, and in order to definitely learn the registration information of the second node which the first node needs to query, the query message sent by the first node is required to carry the information used for identifying the second node. Since names and virtual IP addresses of nodes are different from each other, the query message sent by the first node may carry the name of the second node and/or the virtual IP address of the second node. Definitely, the query message sent by the first node may further carry other information used for identifying the second node, but the embodiment of the present invention is not limited herein.

Embodiment 8

Figure 12:
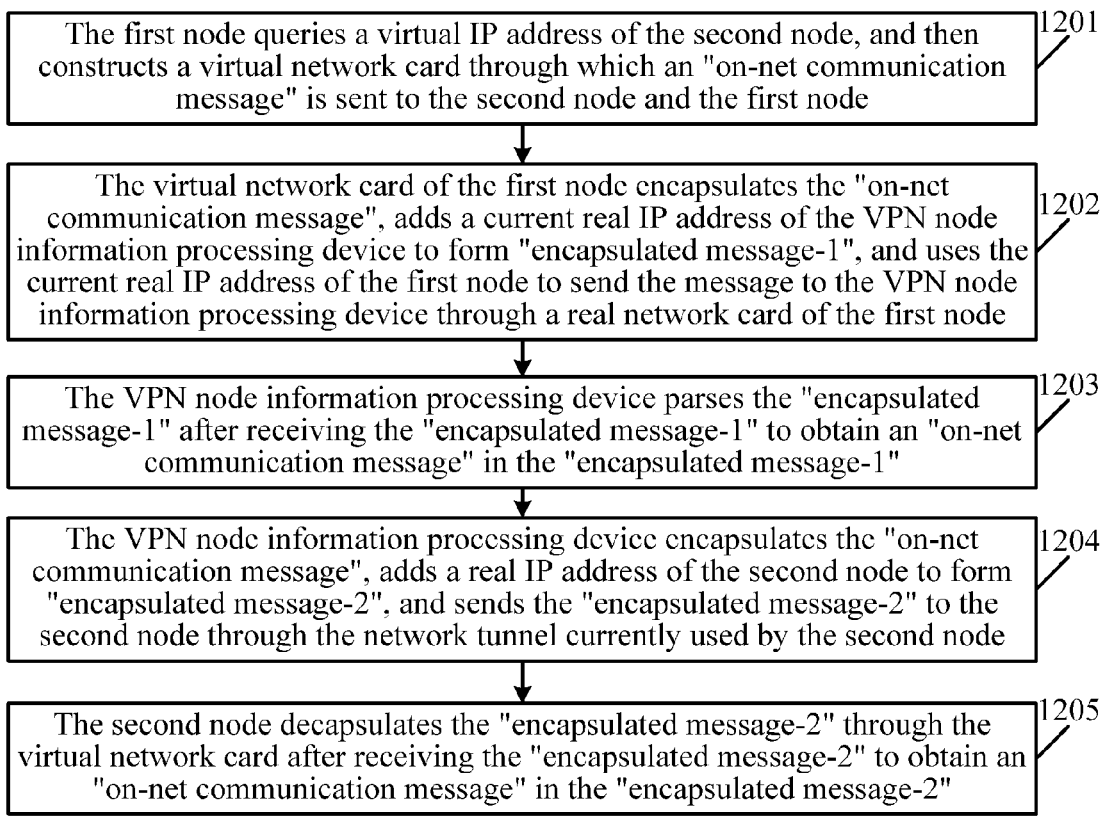
FIG. 12 is a flow chart of a VPN node communication method according to an embodiment of the present invention.

FIG. 12 is a flow chart of a VPN node communication method according to Embodiment 8 of the present invention. Referring to FIG. 12, this embodiment is performed on the basis of registering node registration information and querying the node registration information in the foregoing embodiment. In this embodiment, the communication between a first node and a second node is taken as an example to introduce the VPN node communication method according to the embodiment of the present invention. As shown in FIG. 12, the method may include the following steps.

Step 1201: The first node queries a virtual IP address of the second node, and then constructs a virtual network interface card through which an "on-net communication message" is sent to the second node and the first node.

It should be noted that, in the VPN, each node has a virtual network interface card and a real network interface card, in which, the function of the virtual network interface card is to send the on-net communication message according to the virtual IP address, and the function of the real network interface card is to send the on-net communication message according to a current real IP address.

Step 1202: The virtual network interface card of the first node encapsulates the "on-net communication message", adds a current real IP address of the VPN node information processing device to form "encapsulated message-1", and uses the current real IP address of the first node to send the message to the VPN node information processing device through a real network interface card of the first node.

Step 1203: The VPN node information processing device parses the "encapsulated message-1" after receiving the "encapsulated message-1" to obtain an "on-net communication message" in the "encapsulated message-1".

Step 1204: The VPN node information processing device encapsulates the "on-net communication message", adds a real IP address of the second node to form "encapsulated message-2", and sends the "encapsulated message-2" to the second node through the network tunnel currently used by the second node.

The VPN node information processing device learns that the "on-net communication message" needs to be transmitted to the second node according to the virtual IP address of the second node carried by the "on-net communication message".

For example, the VPN node information processing device may also query the information such as the real IP address of the second node, and the network tunnel currently used by the second node.

Step 1205: The second node decapsulates the "encapsulated message-2" through the virtual network interface card after receiving the "encapsulated message-2" to obtain an "on-net communication message" in the "encapsulated message-2".

By now, the first node completes the communication with the second node once through the relay of the VPN node information processing device. The message encapsulation/decapsulation in the foregoing process is transparent for network application in the first node and the second node, and the network application may consider that the virtual IP address of the first node and the virtual IP address of the second VPN node are directly used for communication.

The process of sending the "on-net communication message" by the first node to the second node is the same as the process of sending the "on-net communication message" by the second node to the first node, which is not described herein again in this embodiment.

The VPN node information processing device according to the embodiment of the present invention may receive the information sent by the first node and transmit the information to the corresponding second node on the basis of centralized-registering the registration information of the node, and transmits the information sent by the second node to the corresponding first node, so the indirect network channel between the first node and the second node may be established.

Embodiment 9

Figure 13:
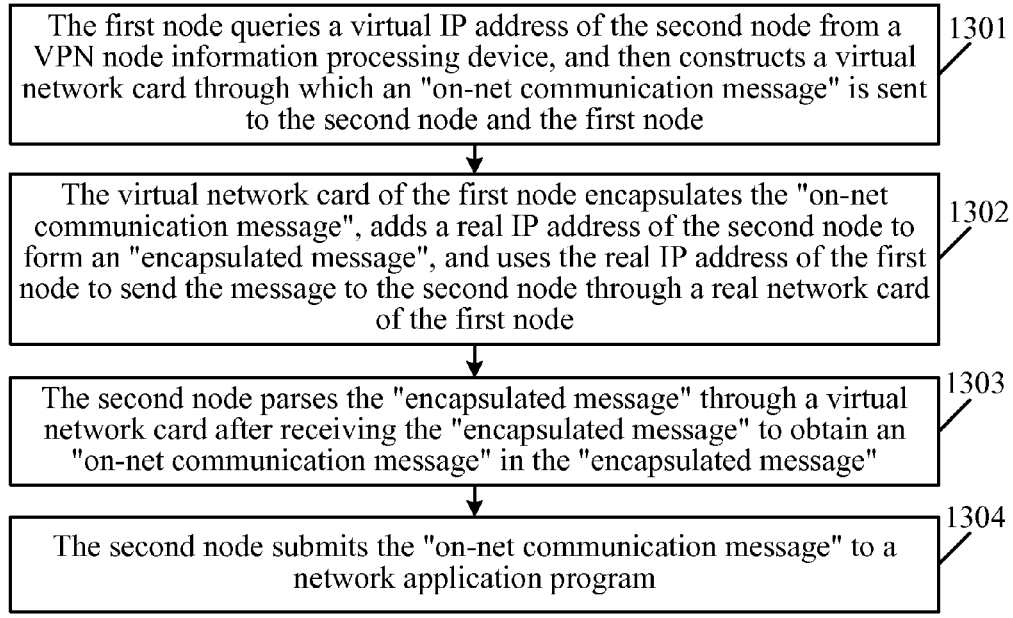
FIG. 13 is a flow chart of a VPN node communication method according to an embodiment of the present invention.

FIG. 13 is a flow chart of a VPN node communication method according to Embodiment 9 of the present invention. Referring to FIG. 13, this embodiment is performed on the basis of registering node registration information and querying the node registration information in the foregoing embodiment. In this embodiment, the communication between a first node and a second node is taken as an example to introduce the VPN node communication method according to the embodiment of the present invention. As shown in FIG. 13, the method may include the following steps.

Step 1301: The first node queries a virtual IP address of the second node from a VPN node information processing device, and then constructs a virtual network interface card through which an "on-net communication message" is sent to the second node and the first node.

Step 1302: The virtual network interface card of the first node encapsulates the "on-net communication message", adds a real IP address of the second node to form an "encapsulated message", and uses the real IP address of the first node to send the message to the second node through a real network interface card of the first node.

Step 1303: The second node parses the "encapsulated message" through a virtual network interface card of the second node after receiving the "encapsulated message" to obtain an "on-net communication message" in the "encapsulated message".

Step 1304: The second node submits the "on-net communication message" to a network application program.

By now, the network connection is performed between the first node and the second node directly through the current real IP address, so that the network application of the first node and the second node implements a process once that the communication is performed by using the real IP address of the first node and the real IP address of the second node.

The message encapsulation/decapsulation in the foregoing process is transparent for the network application in the first node and the second node, and the network application may consider that the virtual IP address of the first node and the virtual IP address of the second node are directly used for communication.

The VPN node information processing device according to the embodiment of the present invention may send the registration information of the second node queried by the first node to the first node, so that a direct connection network tunnel may be established between the first node and the second node.

Embodiment 10

The embodiment of the present invention provides a network tunnel establishing method, a data transmission method, a communication system and a relevant device, so as to improve data transmission performance in a VPN.

Figure 14:
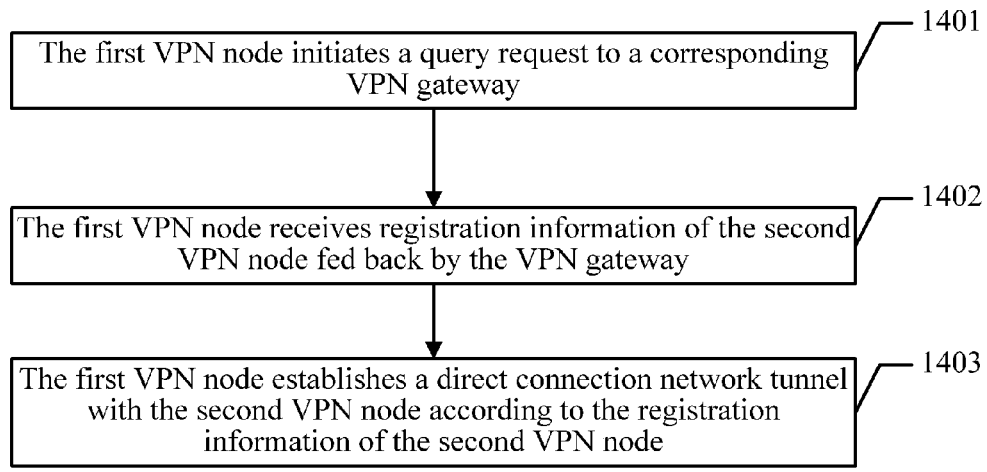
FIG. 14 is a flow chart of an embodiment of a network tunnel establishing method according to an embodiment of the present invention.

Referring to FIG. 14, one embodiment of the network tunnel establishing method in the embodiment of the present invention includes the following steps.

Step 1401: The first VPN node initiates a query request to a corresponding VPN gateway according to a locally pre-configured VPN gateway address.

In this embodiment, when a first VPN node expects to communicate with a second VPN node, a node ID of the second VPN node may be determined, and may specifically be a node name or a node number, which is not limited herein.

When the first VPN node requests establishing a direct connection network tunnel with the second VPN node, the first VPN node needs to learn the registration information of the second VPN node, and then sends a query request to the VPN gateway, so as to request obtaining the registration information of the second VPN node, in which the query request carries the node ID of the second VPN node, so as to be queried by the VPN gateway conveniently.

It should be noted that, after each VPN node is added into the VPN, each VPN node stores a VPN gateway address of the VPN, such as "IPgw:Pgw", in which IPgw is a real IP address of the VPN gateway, and Pgw is a port number used by the VPN gateway during the query process.

It can be understood that, in an actual application, the VPN gateway address may also be in other types, such as a URL address, and the specific address type is not limited herein.

The first VPN node may send the query request to a corresponding VPN gateway according to a locally pre-configured VPN gateway address.

Step 1402: The first VPN node receives registration information of the second VPN node fed back by the VPN gateway.

After the first VPN node sends a query request to the VPN gateway, the first VPN node may obtain a query result from the VPN gateway, and the query result is the registration information of the second VPN node.

It should be noted that, when each node is added into the VPN, the node needs to register with the VPN gateway in the VPN, and in the registration process, the VPN gateway may store the registration information of the VPN node requesting registration.

In this embodiment, the registration information of the second VPN node at least includes address information of the second VPN node.

Step 1403: The first VPN node establishes a direct connection network tunnel with the second VPN node according to the registration information of the second VPN node.

After the first VPN node obtains the registration information of the second VPN node from the VPN gateway, the first VPN node may establish a direct connection network tunnel with the second VPN node according to the address information of the second VPN node included in the registration information.

In this embodiment, when the first VPN node expects to communicate with the second VPN node, the first VPN node may obtain the registration information of the second VPN node from the VPN gateway, and the registration information includes the address information of the second VPN node. Therefore, the first VPN node can establish a direct connection network tunnel with the second VPN node according to the address information of the second VPN node, and the first VPN node and the second VPN node may perform data transmission through the direct connection network tunnel, so it is not required to transmit data through the VPN gateway, thereby reducing a data processing pressure of the VPN gateway, balancing a load of each network element in the VPN, and improving data transmission performance in the VPN.

Figure 15:
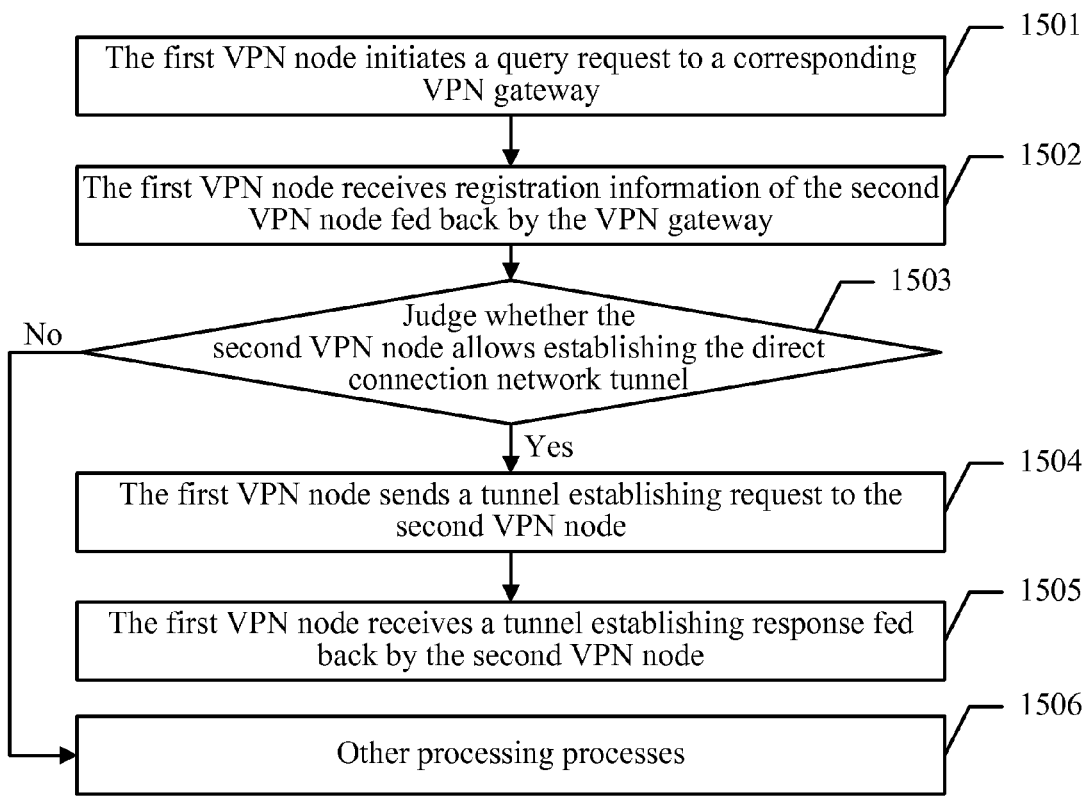
FIG. 15 is a flow chart of another embodiment of a network tunnel establishing method according to an embodiment of the present invention.

For ease of understanding, the network tunnel establishing method according to the embodiments of the present invention is described in the following through a specific embodiment. Referring to FIG. 15, another embodiment of a network tunnel establishing method in the embodiment of the present invention includes the following steps.

Step 1501: The first VPN node initiates a query request to a corresponding VPN gateway according to a locally pre-configured VPN gateway address.

In this embodiment, step 201 is the same as step 101 in the foregoing embodiment, which is not described in detail herein again.

Step 1502: The first VPN node receives registration information of the second VPN node fed back by the VPN gateway.

After the first VPN node sends the query request to the VPN gateway, the first VPN node may obtain a query result from the VPN gateway, and the query result is the registration information of the second VPN node.

In this embodiment, the registration information of the second VPN node may include address information of the second VPN node, and may further include transmission tunnel protocol parameters, network connection mode parameters and encryption parameters.

The transmission tunnel protocol parameters are used for indicating the type of the direct connection network tunnel to be established by the first VPN node and the second VPN node, that is, the protocol used for establishing the direct connection network tunnel.

The network connection mode parameters are used for indicating whether the second VPN node supports establishing the direct connection network tunnel. It should be noted that, if the second VPN node is added into the VPN through an address conversion device, the VPN gateway may detect that the real address used when the second VPN node is added into the VPN is the address of the address conversion device, instead of the real address of the second VPN node, so the VPN gateway may set the network connection mode parameter in the registration information of the second VPN node as "direct connection prohibited".

The encryption parameters are used for indicating whether the direct connection network tunnel established between the first VPN node and the second VPN node needs to be encrypted, and which encryption algorithm is used if the direct connection network tunnel needs to be encrypted.

In this embodiment, the registration information of the nodes stored in the VPN gateway may be as shown in the following table.

TABLE 1

| Node device | Node name | Real address | Virtual address | Transmission tunnel protocol parameter | Network connection mode parameter | Encryption parameter |
|---|---|---|---|---|---|---|
| Road Warrier-1 | NID-1 | IP1:P1 | VIP1 | IPsec | Direct connection allowed | No |
| Road Warrier-2 | NID-2 | IP2:P2 | VIP2 | IPsec | Direct connection allowed | Yes, A |
| Road Warrier-3 | NID-3 | IP3:P3 | VIP3 | SSL | Direct connection prohibited | No, B |

Step 1503: Judge whether the second VPN node allows establishing the direct connection network tunnel, and if the second VPN node allows establishing the direct connection network tunnel, step 1504 is performed; if the second VPN node does not allow establishing the direct connection network tunnel, step 1506 is performed.

In this embodiment, after the first VPN node obtains the registration information of the second VPN node, the first VPN node judges whether the second VPN node allows establishing the direct connection network tunnel according to the network connection mode parameters in the registration information, and if the second VPN node allows establishing the direct connection network tunnel, step 1504 is performed; if the second VPN node does not allow establishing the direct connection network tunnel, step 1506 is performed.

Step 1504: The first VPN node sends a tunnel establishing request to the second VPN node.

If the first VPN node determines that the second VPN node allows establishing the direct connection network tunnel, the first VPN node may send a tunnel establishing request to the second VPN node according to the address information of the second VPN node, in which the tunnel establishing request carries a node ID of the first VPN node, the address information of the first VPN node and the transmission tunnel protocol parameters.

It should be noted that, if the encryption parameters in the registration information of the second VPN node indicate that the encryption is required, and indicate the specific encryption algorithm, the tunnel establishing request in this step may further carry a key initially determined by the first VPN node according to the encryption algorithm, so as to negotiate a key with the second VPN node. In this embodiment, the process of determining the key according to the encryption algorithm is the common sense learned by persons skilled in the art, which is not limited herein.

Step 1505: The first VPN node receives a tunnel establishing response fed back by the second VPN node.

In this embodiment, after the second VPN node receives the tunnel establishing request sent by the first VPN node, the second VPN node stores the node ID of the first VPN node and the address information of the first VPN node in the tunnel establishing request, executes the relevant tunnel establishing process according to the transmission tunnel protocol parameters, and then feeds back a tunnel establishing response to the first VPN node. If the tunnel establishing request carries the key initially determined by the first VPN node, the tunnel establishing response may also carry the key determined and finally used by the second VPN node.

The relevant tunnel establishing process executed by the second VPN node according to the transmission tunnel protocol parameters may specifically include the operations such as resource allocation and port setting, and may also include other operations in the actual application, which are not limited herein.

It should be noted that, the second VPN node may be locally pre-configured with a "node-tunnel" information list, the list stores the information related to the direct connection network tunnel established by the second VPN node, and the information is specifically as shown in the following table.

TABLE 2

| Node device | Node name | Real address | Virtual address | Channel ID |
| --- | --- | --- | --- | --- |
| Road Warrier-1 | NID-1 | IP1:P1 | VIP1 | Tunnel-1 |

It can be seen from table 2 that, a direct connection network tunnel established between the second VPN node and the first VPN node (that is, a VPN node with the node name being NID-1) is locally stored in the second VPN node, and the channel ID is Tunnel-1.

The first VPN node receives a tunnel establishing response sent by the second VPN node, stores the node ID of the second VPN node and the address information of the second VPN node, and executes the relevant tunnel establishing process according to the transmission tunnel protocol parameters.

The relevant tunnel establishing process executed by the first VPN node according to the transmission tunnel protocol parameters may include the operations such as resource allocation and port setting, and may also include other operations in the actual application, which are not limited herein.

It should be noted that, the first VPN node may also be locally pre-configured with a "node-tunnel" information list, the list stores the information related to the direct connection network tunnel established by the first VPN node, and the information is specifically as shown in the following table.

TABLE 3

| Node device | Node name | Real address | Virtual address | Channel ID |
| --- | --- | --- | --- | --- |
| Road Warrier-2 | NID-2 | IP2:P2 | VIP2 | Tunnel-1 |

It can be sent from table 3 that, a direct connection network tunnel established between the first VPN node and the second VPN node (that is, a VPN node with the node name being NID-2) is locally stored in the first VPN node, and the channel ID is Tunnel-1.

Step 1506: Execute other processing processes.

If the first VPN node determines that the second VPN node does not allow establishing the direct connection network tunnel, the first VPN node may communicate with the second VPN node through a VPN gateway relay manner, and the specific process is common sense known by persons skilled in the art, which is not limited herein.

It should be noted that, in this embodiment, the address information of the first VPN node and the address information of the second VPN node may be respectively an IPv4 address, an IPv6 address, or a URL address.

In this embodiment, when the first VPN node expects to communicate with the second VPN node, the first VPN node may obtain the registration information relevant to the second VPN node from the VPN gateway, and the registration information includes the address information of the second VPN node. Therefore, the first VPN node can establish a direct connection network tunnel with the second VPN node according to the address information of the second VPN node, and the first VPN node and the second VPN node may perform data transmission through the direct connection network tunnel, so it is not required to transmit data through the VPN gateway, thereby reducing a data processing pressure of the VPN gateway, balancing a load of each network element in the VPN, and improving data transmission performance in the VPN.

In addition, the registration information of the second VPN node may further include the network connection mode parameters, and the first VPN node can establish the direct connection network tunnel with the second VPN node only when the network connection mode parameters indicate that the second VPN node allows direct connection, thereby avoiding the problem that the establishment of the direct connection network tunnel by the first VPN node with the second VPN node causes communication failure when the second VPN node is added into the VPN by using the address conversion device.

Furthermore, the registration information of the second VPN node may further include the encryption parameters, so that the first VPN node may negotiate a key with the second VPN node, so as to establish an encrypted direct connection network tunnel, thereby improving data transmission security.

Figure 16:
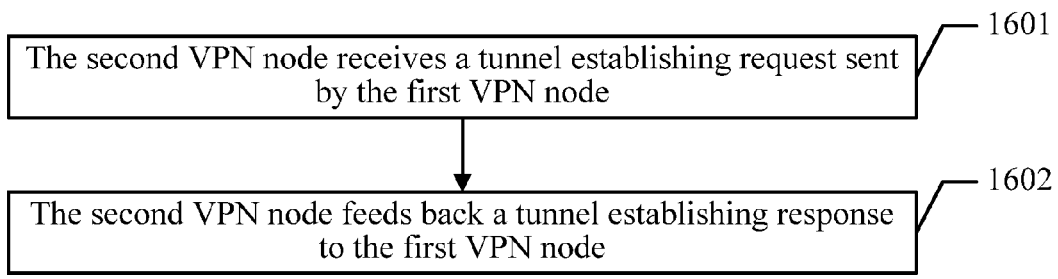
FIG. 16 is a flow chart of still another embodiment of a network tunnel establishing method according to an embodiment of the present invention.

The network tunnel establishing process in the embodiment of the present invention is described above in terms of the first VPN node, and the network tunnel establishing method in the embodiment of the present invention is described in the following in terms of the second VPN node. Referring to FIG. 16, still another embodiment of a network tunnel establishing method in the embodiment of the present invention includes the following steps.

Step 1601: The second VPN node receives a tunnel establishing request sent by the first VPN node.

In this embodiment, the second VPN node receives the tunnel establishing request sent by the first VPN node, and the tunnel establishing request includes a node ID of the first VPN node and address information of the first VPN node.

It should be noted that, the tunnel establishing request in this embodiment may further include transmission tunnel protocol parameters for indicating a protocol used for establishing the direct connection network tunnel.

Step 1602: The second VPN node feeds back a tunnel establishing response to the first VPN node.

After the second VPN node receives the tunnel establishing request, the second VPN node stores the node ID of the first VPN node and the address information of the first VPN node, executes the relevant tunnel establishing process, and feeds back a tunnel establishing response to the first VPN node.

The relevant tunnel establishing process executed by the second VPN node may include the operations such as resource allocation and port setting, and may also include other operations in the actual application, which are not limited herein.

If the tunnel establishing request further includes transmission tunnel protocol parameters, the second VPN node executes the relevant tunnel establishing process according to the transmission tunnel protocol parameters.

It should be noted that, in this embodiment, the address information of the first VPN node may be an IPv4 address, an IPv6 address, or a URL address.

In this embodiment, the second VPN node may establish the direct connection network tunnel with the first VPN node according to the tunnel establishing request sent by the first VPN node, so as to perform data transmission, and it is not required to transmit the data through the VPN gateway, thereby reducing a data processing pressure of the VPN gateway, balancing a load of each network element in the VPN, and improving data transmission performance in the VPN.

Figure 17:
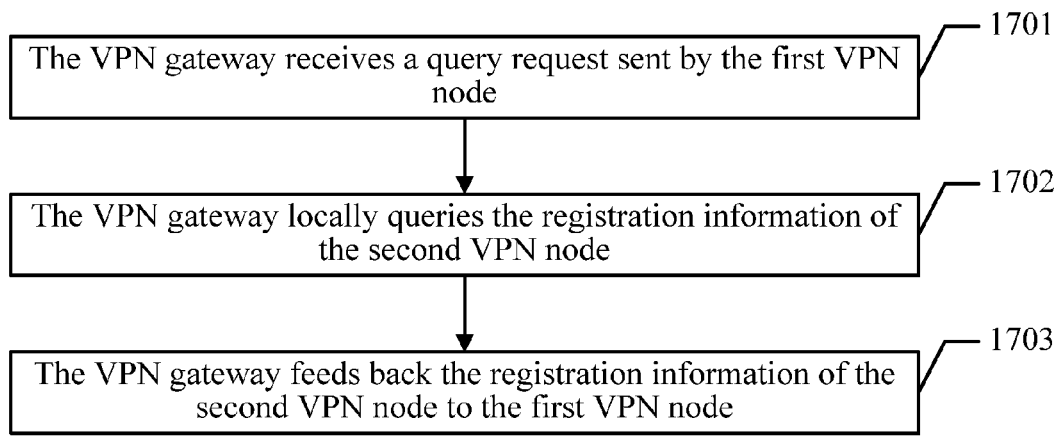
FIG. 17 is a flow chart of an embodiment of a data transmission method according to an embodiment of the present invention.

The network tunnel establishing method in the embodiment of the present invention is described above in terms of the first VPN node and the second VPN node, and the operation in this embodiment executed by the VPN gateway is described in the following in terms of the VPN gateway. Referring to FIG. 17, one embodiment of a data transmission method in the embodiment of the present invention includes the following steps.

Step 1701: The VPN gateway receives a query request sent by the first VPN node.

In this embodiment, when the first VPN node requests establishing a direct connection network tunnel with the second VPN node, the first VPN node may send the query request to the VPN gateway for querying registration information of the second VPN node, and the query request carries a node ID of the second VPN node.

It should be noted that, when each node is added into the VPN, the VPN gateway receives a registration request of each node, in which the registration request at least carries the node ID and address information of the node, and may further carry transmission tunnel protocol parameters, network connection mode parameters and encryption parameters of the node. In the registration process, the VPN gateway may store the registration information of the VPN nodes requesting registration, and the registration information of each VPN node stored by the VPN gateway may be as shown in the foregoing table 1.

Step 1702: The VPN gateway locally queries the registration information of the second VPN node.

After the VPN gateway learns the node ID of the second VPN node from the query request, the VPN gateway may query the registration information of the second VPN node according to the node ID in the foregoing table 1, and the queried registration information at least includes the address information of the second VPN node, or may further carry the transmission tunnel protocol parameters, the network connection mode parameters and the encryption parameters of the second VPN node.

Step 1703: The VPN gateway feeds back the registration information of the second VPN node to the first VPN node.

After the VPN gateway queries the registration information of the second VPN node, the VPN gateway may feed back the registration information of the second VPN node to the first VPN node, so that the first VPN node establishes the direct connection network tunnel with the second VPN node according to the registration information of the second VPN node.

In this embodiment, the VPN gateway may feed back the registration information of the second VPN node to the first VPN node according to the query request of the first VPN node, so that the first VPN node establishes the direct connection network tunnel with the second VPN node according to the registration information of the second VPN node, so data transmission may be performed between the first VPN node and the second VPN node through the direct connection network tunnel, and it is not required to transmit the data through the VPN gateway, thereby reducing a data processing pressure of the VPN gateway, balancing a load of each network element in the VPN, and improving data transmission performance in the VPN.

Embodiment 11

Figure 18:
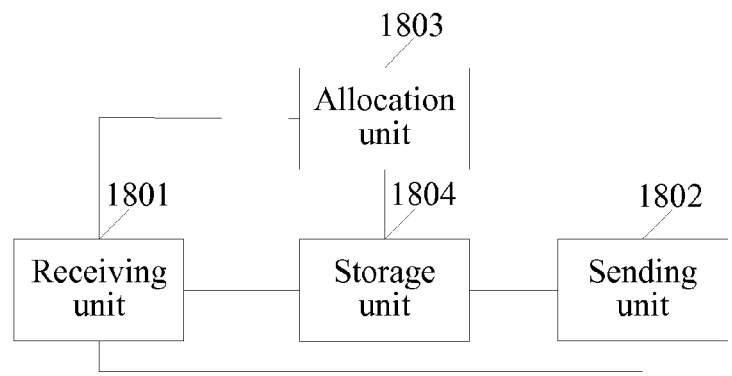
FIG. 18 is a structure diagram of a VPN server according to an embodiment of the present invention.

FIG. 18 is a structure diagram of a VPN server according to an embodiment of the present invention. As shown in FIG. 18, the VPN server may include a receiving unit 1801 and a sending unit 1802.

The receiving unit 1801 is configured to receive a message sent by a first node, in which the message is used for querying registration information of a second node.

The sending unit 1802 is configured to send the pre-stored registration information of the second node to the first node, so that the first node establishes a corresponding network tunnel with the second node, in which the registration information of the second node at least includes information indicating whether the second node accepts external connection.

In this embodiment, the message received by the receiving unit 1801 and sent by the first node may be further used for querying the registration information of the first node, and the sending unit 1802 may also further send the registration information of the first node to the first node, in which the registration information of the first node at least includes the information indicating whether the first node accepts the external connection.

For example, in this embodiment, the corresponding network tunnel includes a direct connection network tunnel in a direct connection channel mode and an indirect network tunnel in a virtual switch mode.

Preferably, the registration information of the second node may include, but is not limited to, a current real IP address, a virtual IP address and the information indicating whether to accept the external connection of the second node.

Likewise, the registration information of the first node may include, but is not limited to, a current real IP address, a virtual IP address and the information indicating whether to accept the external connection of the first node.

Preferably, the receiving unit 1801 may further be configured to receive an access request message sent by the first node and an access request message sent by the second node.

The access request message sent by the first node includes a node name and a current real IP address of the first node, and the access request message sent by the second node includes a node name and a current real IP address of the second node.

The VPN server according to the embodiment of the present invention may further include an allocation unit 1803 and a storage unit 1804.

The allocation unit 1803 is configured to allocate a virtual IP address for the first node according to the access request message received by the receiving unit 1801 and sent by the first node, and determine the information indicating whether the first node accepts the external connection.

The allocation unit 1803 is further configured to allocate a virtual IP address for the second node according to the access request message received by the receiving unit 1801 sent by the second node, and determine the information indicating whether the second node accepts the external connection.

The storage unit 1804 is configured to store a corresponding relation among the node name, the current real IP address, the allocated virtual IP address and the information indicating whether to accept the external connection of the first node.

The storage unit 1804 is further configured to store a corresponding relation among the node name, the current real IP address, the allocated virtual IP address and the information indicating whether to accept the external connection of the second node, and register the node names, the current real IP addresses, and the virtual IP addresses of the first node and the second node, the information indicating whether the first node accepts the external connection of the first node, and the information indicating whether the second node accepts the external connection of the second node as the registration information of the first node and the second node.

Preferably, after the allocation unit 1803 respectively allocates the virtual IP addresses for the first node and the second node, the allocation unit 1803 sends a connection request for establishing the network tunnel to the first node to judge whether the first node accepts the external connection, determines that the first node accepts the external connection after receiving a response returned by the first node within a given time, and determines that the first node does not accept the external connection if the allocation unit 1803 cannot receive the response returned by the first node within the given time.

In addition, the allocation unit 1803 also sends a connection request for establishing the network tunnel to the second node to judge whether the second node accepts the external connection, determines that the second node accepts the external connection after receiving a response returned by the second node within a given time, and determines that the second node does not accept the external connection if the allocation unit 1803 cannot receive the response returned by the second node within the given time.

Furthermore, the current real IP address of the second node refers to a legal address of the second node in the Internet, and may be specifically an IP address of the second node in the Internet, an address obtained after the combination of the IP address of the second node in the Internet and a TCP/UDP port, or other service addresses of the second node indicated through a URL in the Internet.

Likewise, the current real IP address of the first node refers to a legal address of the first node in the Internet, and may be specifically an IP address of the first node in the Internet, an address obtained after the combination of the IP address of the first node in the Internet and a TCP/UDP port, or other service addresses of the first node indicated through a URL in the Internet.

A VPN server according to Embodiment 4 of the present invention is introduced in detail. In the VPN server according to the embodiment of the present invention, the receiving unit 1801 may receive a request of the first node, and the sending unit 1802 may send the registration information of the second node and the first node to the first node according to the request of the first node, so that the first node may learn whether the second node and the first node accept the external connection before establishing the network tunnel with the second node, and further establishes the corresponding network tunnel with the second node, which avoids a case that when two network nodes are connected to each other merely through the virtual switch mode, the two nodes still attempt to establish a direct connection network tunnel till the establishment fails, thereby reducing the waste of network resources and improving the network tunnel establishing efficiency.

Embodiment 12

Figure 19:
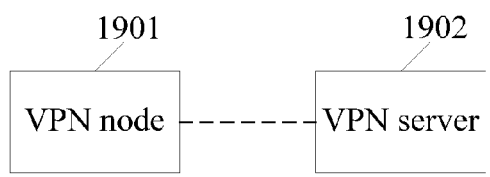
FIG. 19 is a structure diagram of a VPN system according to an embodiment of the present invention.

Referring to FIG. 19, FIG. 19 is a structure diagram of a VPN system according to an embodiment of the present invention. As shown in FIG. 19, the VPN system may include:
a VPN node 1901 and a VPN server 1902.

The VPN node 1901 is configured to query registration information of a second node from the VPN server 1902, so as to determine whether the second node accepts external connection, in which the registration information of the second node at least includes information indicating whether the second node accepts the external connection; and establish a corresponding network tunnel with the second node according to the queried registration information.

The VPN server 1902 is configured to receive a message sent by the VPN node 1901, in which the message is used for querying the registration information of the second node; and send pre-stored registration information of the second node to the VPN node 1901, so that the VPN node 1901 establishes a corresponding network tunnel with the second node, in which the registration information of the second node at least includes the information indicating whether the second node accepts the external connection.

It should be noted that, the function of the structure of the VPN node 1901 introduced in this embodiment is the same as that of the structure of the VPN node introduced in Embodiment 3, which is not described herein in this embodiment. The function of the structure of the VPN server 1902 introduced in this embodiment is the same as that of the structure of the VPN server introduced in Embodiment 4, which is not described herein either in this embodiment.

Figure 20:
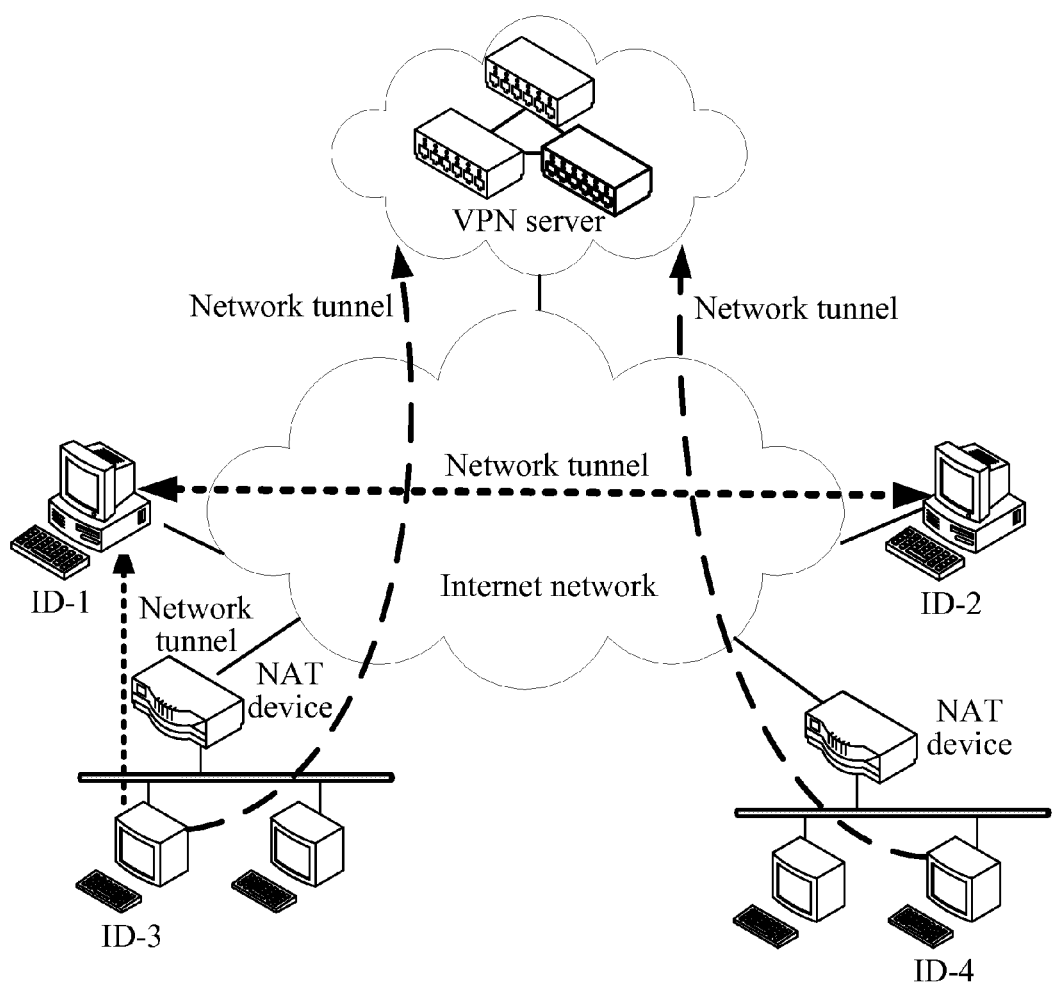
FIG. 20 is a schematic diagram of a VPN according to an embodiment of the present invention.

Referring to FIG. 20, FIG. 20 is a schematic diagram of a VPN according to an embodiment of the present invention. As shown in FIG. 20, the VPN according to this embodiment may include a VPN server and a VPN node. The VPN node may include, but is not limited to, a computer and other user terminals. The VPN server must possess a legal address (the form of the address may be an IP address, a combination of the IP address and a TCP/UDP port, or other service addresses indicated through a URL) in the Internet, and may use the legal Internet address to receive a data message from the Internet.

The VPN server needs to have a node registration function and an information query function, that is, when a certain node accesses the VPN, the VPN server needs to allocate a virtual IP address used by a first node in the VPN for the node, and registers the information such as a node name, a current real IP address, the allocated virtual IP address, information indicating whether to accept the external connection and even encryption parameters of the first node.

The VPN server allows the node in the VPN to query the registration information of other VPN nodes according to the information such as the node names of other VPN nodes and/or the virtual IP addresses of other VPN nodes.

A node in this embodiment should have a function of communicating with the VPN server, a function of initiating a request for establishing a network tunnel with other nodes in the VPN; meanwhile, the node in this embodiment should further have a function of receiving a request for establishing a network tunnel with other nodes in the VPN; and meanwhile, the node in this embodiment should further have a function of learning the registration information of other nodes and the registration information of the first node, and establishing a corresponding network tunnel with other nodes.

The corresponding network tunnel includes a direct connection network tunnel in a direct connection channel mode and an indirect network tunnel in a virtual switch mode.

As shown in FIG. 20, the VPN includes four networked computers respectively named ID-1, ID-2, ID-3, and ID-4, in which ID-1 and ID-2 are the computers possessing legal IP addresses in the Internet, and are allowed to accept the network connection from the Internet; ID-3 and ID-4 are both located in an NAT network, do not have legal Internet addresses, and are not allowed to accept the network connection from the Internet.

In the VPN, the network communication between the nodes includes the following three different conditions.

1) Bi-directional network connection may be established directly between the nodes, for example, between ID-1 and ID-2, any one of the nodes may actively establish a network tunnel with the other node.

2) Unidirectional connection can merely be directly established between the nodes, for example, between ID-1 and ID-3, since ID-3 is located in the NAT network and does not have a legal IP address, ID-3 is merely allowed to actively establish a network tunnel with ID-1, and ID-1 is not allowed to establish a network tunnel with ID-3.

3) Connection cannot be directly established between the nodes, for example, between ID-3 and ID-4, since ID-3 and ID-4 are both located in the NAT network and neither ID-3 nor ID-4 has a legal IP address, a direct tunnel cannot be established between the ID-3 and ID-4, ID-3 and ID-4 can merely and respectively establish the network tunnel with the VPN server, and the communication data between ID-3 and ID-4 must be relayed through the VPN server.

If ID-1 in the VPN as shown in FIG. 20 needs to communicate with ID-2 and ID-3, the following steps are included.

1) ID-1 queries the registration information of ID-2 and ID-3 from the VPN server.

2) ID-1 queries the registration information of ID-1 from the VPN server.

In step 1), ID-1 sends a query message to the VPN server, in which the query message is used for querying the registration information of ID-2 from the VPN server, and may include the name of ID-2 and the current real IP address of ID-2.

ID-1 sends a query message to the VPN server, in which the query message is used for querying the registration information of ID-3 from the VPN server, and may include the name of ID-3 and the current real IP address of ID-3.

In step 2), ID-1 sends a query message to the VPN server, in which the query message is used for querying the registration information of ID-1 from the VPN server, and may include the name of ID-1 and the current real IP address of ID-1.

After the VPN server receives the query message sent by ID-1, the VPN server queries the registration information of ID-2 and ID-3, and sends the registration information to ID-1. Table 1 shows the registration information of ID-1, ID-2, ID-3 and ID-4 in the VPN as shown in FIG. 3 and pre-stored by the VPN server.

TABLE 1

| Node | Node name | Current real IP address | Virtual IP address | Whether to accept external connection |
| --- | --- | --- | --- | --- |
| ID-1 | NID-1 | IP1:P1 | VIP1 | OK |
| ID-2 | NID-2 | IP2:P2 | VIP2 | OK |
| ID-3 | NID-3 | IP3:P3 | VIP3 | NO |
| ID-4 | NID-4 | IP4:P4 | VIP4 | NO |

Since ID-3 and ID-4 are both located in the NAT device, the current real IP addresses of ID-3 and ID-4 are actually the real IP addresses of the NAT device used by ID-3 and ID-4.

3) After the VPN server respectively receives the query message sent by ID-1, the queried registration information of ID-2 is as follows: the name is NID-2, the real address is IP2:P2, the virtual IP address is VIP2, and external connection is allowed to be accepted.

The queried registration information of ID-3 is as follows: the name is NID-3, the real address is IP3:P3, the virtual IP address is VIP3, and external connection is not allowed to be accepted.

The queried registration information of ID-1 is as follows: the name is NID-1, the real address is IP1:P1, the virtual IP address is VIP1, and external connection is allowed to be accepted.

4) The VPN server sends the registration information of ID-2, ID-3 and ID-1 to ID-1 respectively according to the queried registration information of ID-2, ID-3 and ID-1.

Definitely, the VPN server may also only select a part of the registration information of ID-2, ID-3 and ID-1 and send the part of the registration information of ID-2, ID-3 and ID-1 to ID-1. For example, the VPN server sends the registration information of ID-2 that the real address is IP2:P2 and the external connection is allowed to be accepted, the registration information of ID-3 that the external connection is not allowed to be accepted, and the registration information of ID-1 that the real address is IP1:P1 and the external connection is allowed to be accepted to ID-1.

5) After ID-1 receives the registration information of ID-2, ID-3 and ID-1 sent by the VPN server, when finding that ID-2 accepts the external connection, ID-1 sends a network tunnel establishing request to ID-2. If ID-1 receives a response sent by ID-2, a direct connection network tunnel in a direct connection channel mode between ID-1 and ID-2 is established.

If ID-1 finds that ID-3 does not accept the external connection, while ID-1 accepts the external connection, ID-1 sends a message used for prompting ID-3 to actively establish the network tunnel with ID-1 to ID-3, receives a network tunnel establishing request sent by ID-3. After ID-1 receives a response sent by ID-3, an indirect network tunnel in a virtual switch mode between ID-1 and ID-3 is established.

If ID-3 in the VPN as shown in FIG. 20 needs to communicate with ID-4, the following steps are included.

1) ID-3 queries the registration information of ID-4 from the VPN server.

2) ID-3 queries the registration information of ID-3 from the VPN server.

In step 1), ID-3 sends a query message to the VPN server, in which the query message is used for querying the registration information of ID-4 from the VPN server, and may include the name of ID-4 and the current real IP address of ID-4.

ID-3 sends a query message to the VPN server, in which the query message is used for querying the registration information of ID-3 from the VPN server, and may include the name of ID-3 and the current real IP address of ID-3.

3) After the VPN server receives the query message sent by ID-3, the queried registration information of ID-4 is as follows: the name is NID-4, the real address is IP4:P4, the virtual IP address is VIP4, and external connection is not allowed to be accepted.

The queried registration information of ID-3 is as follows: the name is NID-3, the real address is IP3:P3, the virtual IP address is VIP3, and external connection is not allowed to be accepted.

4) The VPN server sends the registration information of ID-4 and ID-3 to ID-3 respectively according to the queried registration information of ID-4 and ID-3.

Definitely, the VPN server may also merely select a part of the registration information of ID-4 and ID-3 and send the part of the registration information of ID-4 and ID-3 to ID-3. For example, the VPN server sends the registration information of ID-4 that the external connection is not allowed to be accepted and the registration information of ID-3 that the external connection is not allowed to be accepted to ID-3.

5) After ID-3 receives the registration information of ID-4 and ID-3 sent by the VPN server, the ID-3 finds that neither ID-4 nor ID-3 accepts the external connection. It indicates that the direct connection network tunnel between ID-3 and ID-4 cannot be established, and then ID-3 sends a network tunnel establishing request to the VPN server. After ID-3 receives a response sent by the VPN server, the network tunnel between ID-3 and the VPN server is established.

In addition, ID-3 sends a network tunnel establishing message to ID-4, so that ID-4 establishes the network tunnel to the VPN server so as to establish the network tunnel between ID-4 and the VPN server. At this time, the VPN server used as a relay device between ID-3 and ID-4 receives the communication data sent by ID-3 and transmits the data to ID-4, and meanwhile, the VPN server receives the communication data sent by ID-4 and transmits the data to ID-3. In this way, the network tunnel between ID-3 and ID-4 is indirectly established.

It should be noted that, the VPN server in this embodiment needs to pre-store the registration information of ID-1, ID-2, ID-3 and ID-4.

Specifically, the VPN server receives the access request messages sent by ID-1, ID-2, ID-3 and ID-4 respectively, in which the access request messages sent by ID-1, ID-2, ID-3 and ID-4 respectively include respective node names and current real IP addresses.

Virtual IP addresses are allocated for ID-1, ID-2, ID-3 and ID-4 respectively, and it is determined respectively whether D-1, ID-2, ID-3 and ID-4 accept the external connection.

A corresponding relation among respective node names, current real IP addresses, allocated virtual IP addresses and information indicating whether to accept the external connection of ID-1, ID-2, ID-3 and ID-4 is stored.

The determining respectively whether ID-1, ID-2, ID-3 and ID-4 accept the external connection specifically includes the following steps.

After respective virtual IP addresses are allocated for ID-1, ID-2, ID-3 and ID-4 respectively, a connection request for establishing a network tunnel is sent to ID-1, ID-2, ID-3 and ID-4 respectively to judge whether ID-1, ID-2, ID-3 and ID-4 accept the external connection.

When responses returned by ID-1 and ID-2 are received in a given time, it is considered that ID-1 and ID-2 accept the external connection, that is, a property of "whether to accept external connection" of ID-1 and ID-2 is "OK". When the responses returned by ID-1 and ID-2 cannot be received in the given time, it is considered that ID-3 and ID-4 do not accept the external connection, that is, a property of "whether to accept external connection" of ID-3 and ID-4 is "NO".

In addition, if a node stores the registration information of the first node, the node merely needs to query the registration information of the second node from the VPN server, and does not need to query the registration information of the first node from the VPN server again.

A VPN according to Embodiment 5 of the present invention is introduced above; in the VPN according to the embodiment of the present invention, before a node establishes the network tunnel with other nodes, the node may query the registration information of other nodes and the registration information of the first node from the VPN server, so as to learn whether other nodes and the first node accept the external connection and further establish the corresponding network tunnel with other nodes, which avoids a case that when two network nodes are connected to each other merely through the virtual switch mode, the two nodes further attempt to establish a direct connection network tunnel till the establishment fails, thereby reducing the waste of network resources and improving the network tunnel establishing efficiency.

Those of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a ROM (Read-Only Memory), a RAM (Random-Access Memory), a magnetic disk, and an optical disk.

The VPN node information processing method, the relevant device and the relevant system according to the embodiments of the present invention are described in detail above. The principle and implementation of the present invention are described herein through specific examples. The description about the embodiments of the present invention is merely provided for ease of understanding of the method and core ideas of the present invention. Persons of ordinary skill in the art can make variations and modifications to the present invention in terms of the specific implementations and application scopes according to the ideas of the present invention. Therefore, the specification shall not be construed as a limit to the present invention.

What is claimed is:

1. A Virtual Private Network (VPN) node information processing method performed by a network entity communicating with at least two nodes, the at least two nodes including a first node and a second node, comprising:

receiving an access request message sent by a second node, wherein the access request message at least carries authentication information, a current real Internet Protocol (IP) address, a node name of the second node and information indicating whether to accept extranet connection of the second node;

allocating, by a processor coupled to a memory storage, a virtual IP address of the second node when the authentication information of the node is correct;

registering the current real IP address, the node name of the second node, the information indicating whether to accept the extranet connection, and the virtual IP address of the second node as registration information;

receiving a query message sent by the first node, wherein the query message carries at least one of a node name of the second node and the virtual IP address of the second node;

querying registration information of the second node by the first node according to at least one of the node name of the second node and the virtual IP address of the second node;

sending the registration information of the second node to the first node, wherein the registration information of the second node at least carries information indicating whether the second node accepts the extranet connection;

when neither the second node nor the first node accepts the extranet connection, receiving a network tunnel establishing request sent by the first node and a network tunnel establishing request sent by the second node:

sending a network tunnel establishing response to the first node and a network tunnel establishing response to the second node so as to establish a network tunnel between the first node and the second node; and delivering information between the first node and the second node by using the network tunnel between the first node and the second node.

2. The method according to claim 1, further comprising:

receiving a query message sent by the first node, wherein the query message carries at least one of a node name of the first node and a virtual IP address of the first node;

querying registration information of the first node according to at least one of the node name of the first node and the virtual IP address of the first node; and sending the registration information of the first node to the first node, wherein the registration information of the first node at least carries information indicating whether the first node accepts the extranet connection.

3. A Virtual Private Network (VPN) node information processing device, comprising:

a first receiver, configured to receive an access request message sent by a second node, wherein the access request message at least carries authentication information, a current real Internet Protocol (IP) address, a node name of the second node and information indicating whether to accept extranet connection of the second node;

a second receiver, configured to receive a query message sent by a first node, wherein the query message carries a node name of the second node or a virtual IP address of the second node or their both the node name of the second node and the virtual IP address of the second node;

a processor, configured to judge whether the authentication information of the second node is correct, allocate a virtual IP address for the second node when the authentication information of the second node is judged as correct, register the current real IP address, the node name of the second node, the information indicating whether to accept the extranet connection, and the virtual IP address of the second node as registration information, and query registration information of the second node according to the node name of the second node or the virtual IP address of the second node or both the node name of the second node and the virtual IP address of the second node; and a transmitter, configured to send the registration information of the second node to the first node, wherein the registration information of the second node at least carries information indicating whether the second node accepts the extranet connection;

when neither the second node nor the first node accepts the extranet connection, the first receiver is further configured to receive a network tunnel establishing request sent by the first node and a network tunnel establishing request sent by the second node;

wherein the transmitter is further configured to send a network tunnel establishing response to the first node so as to establish a network tunnel between the transmitter and the first node, and send a network tunnel establishing response to the second node so as to establish a network tunnel between the transmitter and the second node: and wherein the processor is further configured to control the second receiver to receive information sent by the first node to the second node, and control the transmitter to transmit the information to the second node, and control the second receiver to receive information sent by the second node to the first node, and control the transmitter to transmit the information to the first node.

4. The processing device according to claim 3, wherein the second receiver is configured to receive a query message sent by the first node, wherein the query message carries at least one of a node name of the first node and a virtual IP address of the first node;

the processor is configured to query registration information of the first node according to at least one of the node name of the first node and the virtual IP address of the first node; and the transmitter is configured to send the registration information of the first node to the first node, wherein the registration information of the first node at least carries information indicating whether the first node accepts the extranet connection.

* * * * *

UNITED STATES PATENT AND TRADEMARK OFFICE
CERTIFICATE OF CORRECTION

| | | |
|---|---|---|
| PATENT NO. | : 8,769,661 B2 | Page 1 of 1 |
| APPLICATION NO. | : 13/289552 | |
| DATED | : July 1, 2014 | |
| INVENTOR(S) | : Wang | |

It is certified that error appears in the above-identified patent and that said Letters Patent is hereby corrected as shown below:

Title page, Assignee's City of Residence "Shenzhen (CN)" should read --Chengdu (CN)--.

In the Claims

Column 31, Claim 3, line 29 "or their both" should read --or both--.

Signed and Sealed this
Twenty-third Day of September, 2014

Michelle K. Lee
*Deputy Director of the United States Patent and Trademark Office*